(12) United States Patent
Abendroth

(10) Patent No.: US 7,698,204 B2
(45) Date of Patent: Apr. 13, 2010

(54) METHOD AND SYSTEM FOR E-COMMERCE FREIGHT MANAGEMENT

(75) Inventor: John C. Abendroth, 6501 N. Crestwood Dr., Glendale, WI (US) 53209

(73) Assignee: John C. Abendroth, Mequon, WI (US)

( * ) Notice: Subject to any disclaimer, the term of this patent is extended or adjusted under 35 U.S.C. 154(b) by 1674 days.

(21) Appl. No.: 09/751,121

(22) Filed: Dec. 28, 2000

(65) Prior Publication Data

US 2002/0087371 A1   Jul. 4, 2002

(51) Int. Cl.
G06Q 40/00 (2006.01)

(52) U.S. Cl. .................................................. 705/37

(58) Field of Classification Search .............. 705/37, 705/5, 7, 10, 1, 26, 28, 402, 27, 400; 709/213, 709/203, 214
See application file for complete search history.

(56) References Cited

U.S. PATENT DOCUMENTS

| | | | | |
|---|---|---|---|---|
| 5,117,364 | A * | 5/1992 | Barns-Slavin et al. | 705/402 |
| 5,337,246 | A * | 8/1994 | Carroll et al. | 705/402 |
| 5,794,207 | A | 8/1998 | Walker et al. | |
| 5,797,127 | A | 8/1998 | Walker et al. | |
| 5,835,716 | A * | 11/1998 | Hunt et al. | 709/213 |
| 5,893,076 | A * | 4/1999 | Hafner et al. | 705/28 |
| 6,035,289 | A * | 3/2000 | Chou et al. | 705/37 |
| 6,064,981 | A * | 5/2000 | Barni et al. | 705/26 |
| 6,125,391 | A * | 9/2000 | Meltzer et al. | 709/223 |
| 6,219,653 | B1 * | 4/2001 | O'Neill et al. | 705/400 |
| 6,233,568 | B1 * | 5/2001 | Kara | 705/410 |
| 6,374,227 | B1 * | 4/2002 | Ye | 705/8 |
| 6,571,213 | B1 * | 5/2003 | Altendahl et al. | 705/1 |
| 6,625,584 | B1 * | 9/2003 | Bains et al. | 705/400 |
| 6,990,467 | B1 * | 1/2006 | Kwan | 705/37 |
| 7,395,237 | B1 * | 7/2008 | Hall et al. | 705/37 |
| 2002/0082970 | A1 * | 6/2002 | Ciroli et al. | 705/37 |
| 2005/0209913 | A1 * | 9/2005 | Wied et al. | 705/12 |

FOREIGN PATENT DOCUMENTS

| | | | |
|---|---|---|---|
| JP | 10051581 | * | 8/1996 |
| WO | WO 02/03287 | * | 10/2000 |

OTHER PUBLICATIONS

"GartnerGroup's Dataquest Says E-Market Makers to Revolutionize Business-to-Business Commerce; New Report Examines These Trading Hubs That Enhance Business-to-Business Commerce"; Business Wire; Oct. 12, 1999; pp. 1-3.*

* cited by examiner

*Primary Examiner*—Ella Colbert

(57) ABSTRACT

A freight management method and system for arranging for shipment of a load, offering equipment, selling a product, or providing a service from a shipper by a carrier, based on shipping data and carrier data supplied by the shipper and the carrier, respectively, comprising a central processing system (10), inputting into the central processing system (10) a request for bids (18), which includes requests to apply predefined rates from the shipper (12) for shipping a load; electronically transmitting an invitation to bid (19) for shipping the load from the central processing system (10) to a plurality of carriers (13); electronically receiving bids (20) at the central processing system (10) from at least some of the carriers (13) for shipping the load; electronically transmitting to the shipper a bid report (21) with bids received from at least some of the carriers (13) receiving the invitation to bids; and electronically receiving from the shipper a bid selection (22) and notifying the carrier of acceptance (23) of at least one of the bids.

37 Claims, 26 Drawing Sheets

Fig. 3a

Load Description — 45

| Commodity being Shipped: | Last Accepted Bid Date & Time (24 Hr. Local) MM/DD/YY HH:MM |
|---|---|
| Shipper Load ID | Date Carrier Must Hold Bid Until: MM/DD/YY HH:MM |
| Weight of the Load: Both weight and units | Pallet Exchange? ☐ |
| Number of Times to Ship Load: 1 ▼ * | Number of Pallets: |
| Maximum Bid Amount (US$): | Hide Max Bid from Carrier: ☐ |
| Matching Method: Normal Matching ▼ | Distribution List Code |

*Please explain Loads that are to be shipped more than once in the Description/Directions Box

Load Destinations — 44

| | City | State | Country | Zip or Postal Code | Pickup/Delivery (MM/DD/YY) | Time (24 Hr. Local) HH:MM | Plus (Hr/Min) | Minus (Hr/Min) |
|---|---|---|---|---|---|---|---|---|
| Origin | | AL ▼ | USA ▼ | | | | | |
| Destin | | AL ▼ | USA ▼ | | | | | |
| Stops Order | | | | | | | | |
| 1. | | ▼ | ▼ | | | | | |
| 2. | | ▼ | ▼ | | | | | |
| 3. | | ▼ | ▼ | | | | | |
| 4. | | ▼ | ▼ | | | | | |
| 5. | | ▼ | ▼ | | | | | |

Carrier Requirements 47

| Load Type: | Transport Mode | | | | Interlining Allowed | Communications | Hazardous License Required |
|---|---|---|---|---|---|---|---|
| | Either/OR | Air | Rail | Ship | Truck | | | |
| ☐ TL | | ☐ | ☐ | ☐ | ☐ | NA ▾ | NA ▾ | NA ▾ |
| ☐ LTL | | | | | | Team Drivers: | Will the Driver Assist? | Minimum Cargo Insurance: |
| ☐ CL | | | | | | NA ▾ | ☐ Yes | NA ▾ |
| ☐ LCL | | | | | | | | |

Equipment Requirements 48

| Is the Equipment Supplied | Equipment Class | Equipment Type: |
|---|---|---|
| ☐ Yes | Trailer ▾ | N/A ▾ |
| Equipment Length: | Equipment Height: | Equipment Width: |
| N/A ▾ | N/A ▾ | N/A ▾ |

Add any further description/directions Here: 49

[text box]

Origin Company
Street Address
City, State, Zip
Telephone, Fax
Contact Name

Destin Company
Street Address
City, State, Zip
Telephone, Fax
Contact Name

Other Details

| Click Here when Done. | Click Here to Clear the Form |
|---|---|
| 43 | 44 |

| | Invitation To Bid |
|---|---|
| | Phone: 1-800-866-IATN Fax: 1-800-952-1194 |
| | Trans/log Number: 970501000503672 |

Please Enter a Bid Amount: US $    Last Accepted Bid: Monday, 19 April 1999 01:59 PM

[      ] [ Submit Bid ]

50, 51, 52, 57, 58

| STOPS | | | | Date & Time | Plus | Minus | Miles |
|---|---|---|---|---|---|---|---|
| Origin | AUSTIN | TX | US | 20 Apr 1999 08:00 AM | | | |
| Destin | TEXAS CITY | TX | US | 21 Apr 1999 05:00 PM | | | 202 |
| | | | | Total Mileage (Calculated By PC Miler) | | | 202 |

53

| SHIPPER INFORMATION | | |
|---|---|---|
| Shipper Type =Independent Shipper | Annual Rev = 245000000 | Employee Cnt = 220 |
| D&B = pending | S&P = pending | CCA = pending |
| Moodys = pending | | |

54

| LOAD TYPE | TRANSPORT MODE |
|---|---|
| Load Information = TL | Transport Mode = TRUCK |

55

| Trailer Equipment: | | |
|---|---|---|
| Van or Reefer | Len Min = 48 | Tandem Type = |
| Extendible Length Min = | Wheels = | Length Max = |
| Lift Gate Service = | Extendible Length Max = | Height Max = |
| Axles = | Trailer Age Max = | Height Min = |
| Num Of Trailers = | Van Shape = | Width Min = 102 |
| Doors = | Van Type = | |

Additional Information

The Commodity to be shipped is GARBAGE BAGS.

The Carrier Must hold this Bid until 3:00:00 PM 04/19/1999.

22 Pallets/Exchange

The Weight of this load is 41,600 LBS.

IATN SHIP2

Best 7 Report
Translog Number: 9705010005077352

Shipper Load ID:

Simple RFB

Complete RFB

| STOPS | | | Date & Time | Plus | Minus | Miles |
|---|---|---|---|---|---|---|
| Origin | ABBOTT | KY | 26 Apr 1999 08:00 AM | : | : | |
| Destn | ROCKLAND | PA | 27 Apr 1999 05:00 PM | : | : | 411 |
| | | | Total Mileage (Calculated By PC Miller) | | | 411 |

Bid Summary

RFB Information

| | 1 | 2 | 3 | 4 |
|---|---|---|---|---|
| Maximum Bid Amount | 0.00 | | | |
| Actual Bids | 395,0.0 | 411,0.0 | 425,0.0 | 475,0.0 |
| Team Drivers | Y | Y | Y | Y |
| Maintenance | | | | |
| Hazardous | Y | N | Y | Y |
| Driver Experience Min | | | | INT |
| | | | | Y |

New Services

Home

SHIPPER PROFILE

COMPANY NAME _____
ADDRESS _____
_____
_____

BILLING ADDRESS _____
_____
_____

CONTACT PERSON _____
ADDRESS _____
PHONE NO. _____
FAX NO. _____
E-MAIL _____ 38

AUTHORIZATION NO. 34

NONE ☐  FIXED (4 DIGITS) ☐☐☐☐  VARIABLE  DAILY ☐  WEEKLY ☐  MO. ☐

APPROX. ANNUAL REVENUE _____ 40
APPROX. NO. OF EMPLOYEES _____

DUN & BRADSTREET ☐ ☐ ☐ ☐ ☐ ☐ ☐ 41
MOODY'S ☐ ☐ ☐ ☐ ☐ ☐ ☐
STANDARD & POOR'S ☐ ☐ ☐ ☐ ☐ ☐ ☐

YOUR CO. FUNCTIONS AS: ☐ ☐ ☐ ☐ ☐ 42
SHIPPER CARRIER BROKER FWD 3PL
YOUR CO. IS RUN BY: ☐ ☐ ☐ ☐ ☐

FIG. 9

CARRIER PROFILE

COMPANY NAME _____
ADDRESS _____
_____
_____

BILLING ADDRESS _____
_____
_____

CONTACT PERSON _____
ADDRESS _____
PHONE NO. _____
FAX NO. _____
E-MAIL _____

AUTHORIZATION NO.

NONE ☐  FIXED ☐☐☐☐  VARIABLE  DAILY ☐  WEEKLY ☐  MO. ☐
       (4 DIGITS)

MEMBER TYPE   SHIPPER ☐  CARRIER ☐  BROKER ☐  FWD ☐  3PL ☐    INTERLINING
                                                              YES ☐  NO ☐

APPROX. ANNUAL REVENUE _____    APPROX. NO. OF EMPLOYEES _____

DUN & BRADSTREET ☐ ☐ ☐ ☐ ☐ ☐ ☐ ☐
DOT RATING ☐ ☐ ☐

ON TIME DELIVERY _____ %   DAMAGE FREE DELIVERY _____ %
TEAM DRIVERS/ SLEEPERS/INTERNAL MAINT./ HAZARDOUS LICENSE

FIG. 10a

DRIVER AND VEHICLE SAFETY INFORMATION

INSURANCE INFORMATION

INTERSTATE SERVICE AREA ☐☐☐☐☐☐☐☐
☐☐☐☐☐☐☐☐
CANADA ☐☐☐☐☐☐☐☐

SERVICES OFFERED ☐☐☐☐☐☐☐☐
☐☐☐☐☐☐☐☐
☐☐☐☐☐☐☐☐

AREA OF CARRIER ☐ ☐ ☐ TYPE OF CARRIER ☐ ☐ ☐

LOAD TYPE ☐ ☐ ☐ COMMUNICATIONS ☐ ☐ ☐

FIG. 10b

|  | AIR | RAIL | SHIP | TRUCK |
|---|---|---|---|---|
| INTERMODAL CAPABILITIES | ☐ | ☐ | ☐ | ☐ |

ALL COMMODITIES?  YES ☐  NO ☐

| CODE | C | CODE | C | CODE | C | CODE | C | CODE | C |
|---|---|---|---|---|---|---|---|---|---|
| 01 |  | 086 |  | 201 |  | 2094 |  | 266 |  |

FIG. 10c

| Number of trailers: | |
|---|---|
| Newest trailer age: | |
| Newest trailer age: | |
| Straight Truck: | |

| TRAILER TYPE | DT DF F → | | | | | | | | | | | | | |
|---|---|---|---|---|---|---|---|---|---|---|---|---|---|---|
| LENGTH | | | | | | | | | | | | | | |
| | 20 | | | | | | | | | | | | | |
| | 26 | | | | | | | | | | | | | |
| | ↓ | | | | | | | | | | | | | |
| | 57 | | | | | | | | | | | | | |
| | | | | | | | | | | | | | | |
| WIDTH | | | | | | | | | | | | | | |
| | 96 | | | | | | | | | | | | | |
| | 102 | | | | | | | | | | | | | |
| | OV | | | | | | | | | | | | | |
| | | | | | | | | | | | | | | |
| HEIGHT | | | | | | | | | | | | | | |
| | 12/6 | | | | | | | | | | | | | |
| | ↓ | | | | | | | | | | | | | |
| | 14/6 | | | | | | | | | | | | | |
| | | | | | | | | | | | | | | |
| SIDES | | | | | | | | | | | | | | |
| WHEELS | | | | | | | | | | | | | | |
| AXLES | | | | | | | | | | | | | | |
| DOORS | | | | | | | | | | | | | | |
| HEATED | | | | | | | | | | | | | | |
| LIFT GATE | | | | | | | | | | | | | | |
| EXTENDIBLES | | | | | | | | | | | | | | |
| TANDEMS | | | | | | | | | | | | | | |
| | | | | | | | | | | | | | | |

FIG. 10d

CARRIER PROFILE RULES AND CHARGES

PLEASE PRINT COMPANY RULES AND CHARGES OR PUT "N/A"

NUMBER OF HOURS LATE
BEFORE LOAD IS FREE
DELAYED OR DETAINED
POWER UNITS
CHARGE PER 15 MIN. LATE
ADVANCING CHARGES

METHOD AND SYSTEM FOR E-COMMERCE FREIGHT MANAGEMENT

TECHNICAL FIELD

The invention relates to a method and system as a communication utility, freight management transportation tool, engine clearinghouse for specified individual or en masse entered single or group/multiple delivered, specified load/loading/tour, equipment/product/service requests by shippers matched to automatic or individually submitted fixed or variable rates/bids for carriage/purchase, while indicating equipment availability and affording optimization by qualified carriers using an electronic computer system with network access for both shippers and carriers along with integrating related freight transportation logistics services for modal and intermodal service on a national and international basis. The network utilizes individually or collectively the Internet, e-mail, electronic data interchange (EDI), a dial-up telephone network, interactive voice response (IVR), computer templates and facsimile (fax).

DESCRIPTION OF THE BACKGROUND ART

In the past, freight commerce between shippers and carriers has involved individual to individual telephone-based communications as well as telephone-based clearinghouses or third party companies employing few to many people to receive requests for shipments and to find available carriers. The shipping industry has relied on many oral communications along with handwritten forms and notes. This has led to widespread mistakes and miscommunication in the areas of load, loading, equipment, routing, delivery, billing and payment information. Such verbal and manual processes have been inefficient, time consuming, personnel intensive and expensive.

The introduction of desktop computers has made more data available to agents handling shipment requests, but the process for matching shippers' requests for shipping loads to freight carriers' critically important equipment availability and prices has yet to be truly addressed. Present products and systems that indicate fixed or variable established carrier lane rates for selection by shippers without guaranteed equipment availability are quite limited at best and can actually fail at high volumes. Many companies spend most of their communication time and efforts in the very attempt to ascertain carrier equipment availability. In this effort some use telephone and facsimile (fax) communication in conjunction with computer database information. Other systems are known generally to be in development with some recently completed, but these systems, while beginning to incorporate some of the basic portions of this invention that were an integral part of this invention at a time substantially prior to their offerings as components of the initial parts of the full concept development of this invention, differ greatly from the methods, system and capabilities of this invention in very important aspects. Companies are rushing to the marketplace with services beginning to parallel or outright copy certain aspects or portions of this invention but in their narrow view actually exacerbate the fragmentation in the industry. This will eventually create a proliferation of thousands of unrelated, non-integrated web sites causing a communications overload. Their directions lack the core requirements and approach to effect a comprehensive universal freight transportation management communication utility method for shippers and carriers along with truly electronically integrating systems, networks, and users. Even present Electronic Data Interchange (EDI) and E-mail approaches just cannot address the requirements to meet the needs in the burgeoning freight transportation communication environment.

There also exist certain electronic bulletin boards for posting loads and/or equipment. These are still even more basic concepts of communication. The information posted on these bulletin boards is developed using the non-automated methods mentioned above as well as computer transmissions. As with other systems, posting services differ even more so from this invention. Such services typically just list origin and destination cities and states, the type of equipment needed, pick-up date, the shipper or carrier name along with a telephone number of same requesting an interested carrier to reply. Some services also indicate a price that would be paid along with the type of commodity being shipped. Recently some of these services have placed these types of bulletin boards on the internet to access carriers. A few of such posting services also let carriers list their names and telephone numbers to offer their equipment at certain locations for shippers to reply. These are very basic services with non-qualified, non-anonymous yet typically unknown participants.

SUMMARY OF THE INVENTION

It has taken a very extended time period, an appreciable amount of money and an enormous effort to develop the concept of the full operational elements of this invention that addresses such a unique and never before available total approach with a freight transportation logistics management method and system.

The freight management system and method is a market neutral, national/international universal computer system/network platform concept, communication utility, load arranging clearinghouse and load/equipment optimization, rate/bid, equipment availability engine for shippers and carriers in the freight transportation industry. It provides a business to business (B2B) internet environment serving shippers, third party logistics companies (3PL), brokers, broker carriers, carriers, freight forwarders, warehousers and other related industry parties in which qualified carriers indicate the extremely important equipment availability and offer carriage or purchase by automatically or individually submitting fixed or variable rates and/or bids to shippers for individual or group/multiple delivered, specified load/loading/tour, equipment/product/service requirements for truckload (TL), less-than-truckload (LTL), container load (CL), and less-than-container load (LCL) freight.

The system allows for shippers and carriers to view any combination of load, tour, equipment, product, and services screens at the same time on one computer screen permitting a true operational advantage in selecting the most advantageous group of components in these related areas.

Information from shippers relative to loads, loading, products, etc. can be entered individually by completing request forms either by individual keystrokes, by resubmitting previously entered saved or archived forms, either in total or as revised or updated, or completely automatically by the direct transfer of one to thousands of load and/or product files from the shippers computer databases en masse to the system which via application transfer programs will automatically enter the required information selected from the fields of database information, thereby, completing each of the individual forms without the need for any shipper keystroke entries. This is a very important element saving considerable time and effort while eliminating the potential personnel errors in re-entering such individual or volumes of previously entered information.

This system also affords the integration of the various aspects of other freight management software/internet applications creating a unique transportation tool to address the entire fractionalized/assorted individual freight transportation industry offerings/products including order entry, procurement, tracking, tracing, proof of delivery, order visibility, warehouse fulfillment, insurance, accounting, billing, finance, and other industry services by providing such access through one proprietary industry portal or grand master bulletin board system.

The aforementioned are crucial elements in providing a usable environment eliminating the need for companies working with thousands of clients to individually address an unwieldy conundrum of multiple individual and/or system computer/internet sites. The system platform provides the foundation on which such enterprise application integration (EAI) resides addressing internal and external process/logic and data exchange requirements, all base keyed to the system numbers interrelated to the individual numbering parameters of each separate integrated application system/network or individual user company. The use of various languages (Extensible Markup Language (XML), HTML, Dynamic HTML, Pearl, SQL, Java Script, C, flat files, FTP, etc.) on various platforms (Unix, HPUX, AIX, NT, Linux, Solaris, etc.) on databases (Oracle, etc.) distributed in various manners (Internet/E-mail, EDI, fax. etc.) must all be able to relate and communicate both data and process logic between sites to effect true E-commerce business-to-business community integration.

The system's user internet sites including individual, group and master boards, both public and private, reside on a Grand Master Bulletin Board which with passwords, codes, multiple level and area filtering and sorting by such elements as corporations, individual names, load/loading, equipment, product, service parameters, etc. the separate individual user bulletin boards are accessed. This grand master bulletin board concept is an extremely important element in the entire process because it permits total integration and communication between any and/or all of the system users. One user board might have eight (8) columns; whereas, another might have eighty (80) columns. Yet, they still can communicate through the commonality of the grand master board that has an unlimited number of columns (i.e.: The grand master board contains all of the columns, all of the areas, all of the services and offerings from all of the individual boards.), affording total customization of user boards as desired. All elements developed or set for a particular user are part of the grand master board, for any individual site is merely a viewing of a specific portion of the whole. A user's accessibility rights determine just how much of the total board may be seen. Also, the grand master board will be duplicated on multiple sites and at multiple locations all fully integrated and continually updated with the same information affording both system redundancy and site access insuring greater availability and higher speed processing.

A private system internet site is referred to as a Private Access Network (PAN) as opposed to a general public site for use by individual organizations and their clients and/or service providers. Requests for Bids (RFB) are submitted by shippers to their own selected/contracted carriers out of view of the general public industry area. These sites can be customized for each individual user company. User corporate names and corporate logos appear on these sites. The user's clients therefore address their site for business—the system provides a service operating and maintaining the engine supporting the site but remaining wholly in the background. That the sites appear as the shippers as opposed to the system's is very important for it maintains the individual corporate operational autonomy with their clients, protecting relationships through the utility nature of their own private system as opposed to any third party control which could or be perceived as a potential competitor having an opportunity of eroding the core of their company business—the valuable hard won client bases. Bulletin board column headings can be modified as well as additional columns, screens and form requirements can be incorporated into a PAN. Multiple levels of integration of other application programs are available as well as duel (mirrored) networks allowing integrated shipper to shipper's 3PL to shipper's and 3PL's carrier bases all through the 3PL as the controlling entity. Shippers can indicate to whom load information is sent from one carrier to thousands of carriers, from specific groups of carriers to individual 3PLs (even competitors when such is in the interests of both parties).

A major carrier could very well be a member or user of hundreds or even thousands of separate shipper and/or third party logistic company (3PL) internet sites with either private or public access on which that carrier would have an opportunity to provide rates or bids to move various freight or loads for individual and multiple shippers. If that carrier had to address each company's internet site individually, such a process would be too inefficient to be commercially practical. Present telephone communications would be more efficient. Such a carrier needs to be able to integrate such sites to allow their viewing on one master bulletin board site for the carrier that can be effectively sorted and filtered along with multiple on screen bulletin board presentations to first allow for efficient handling of the vast amount of information that must be addressed, on many occasions in real time, second to permit desired freight and equipment optimization and third to produce internal time/cost/personnel savings for the carrier. The carrier would be assigned separate member numbers, authorization and location codes for each site, all of which would be tied into one master member number and authorization code permitting the carrier automatic full access to load information to all of the sites with just the main numbers. The carrier's master board would in turn be part of the grand master board of the system allowing the carrier to interact at its discretion with others, even competitors, using the system.

Over and above passwords and authorization codes, users may choose to encipher some or all of their communications with specific parties capable and desiring to receive same in such an electronic encryption format, as an additional measure of security.

Methods of communication include, but are not limited to, Internet, e-mail, electronic data interchange (EDI), telephony (IVR—Interactive Voice Response), computer templates, fax and telephone conversation.

Addressing one representative area of the invention providing a freight management system and method for matching loads from shippers with available equipment of carriers, first begins by creating and then inputting into a central processing system a request for bids, rates and communication (RFB) from a shipper for shipping a particular load. Then, an invitation to bid, rate and or communicate (ITB) for shipping at least one load is automatically created by the system from the submitted RFB and automatically electronically transmitted from the central processing system to a least one or a plurality of qualified carriers, without the carriers initiating communication with the computer system. The carriers access the ITBs through their bulletin boards of shipper loads for which they are qualified and/or selected to view and/or available on the open market. At least one of the carriers then enters a bid and/or rate, dollar amounts being positive, zero or negative, for each load desired which are then submitted and electronically received at the central processing system. One or a plurality of qualified bids and/or rates are then electronically transmitted to the shipper. The shippers access the submitted bids and/or rates through their bulletin boards of their requested loads. Assuming the shipper selects one of the bids and/or rates, the shipper then indicates the bid and/or rate selection that is electronically transmitted and received at the central processing system. The shipper is then notified of the identity and telephone number of the carrier whose bid and/or rate was selected. The parties can then exchange any freight shipping documents necessary to confirm the transaction.

The system may operate anonymously until the shipper is notified of the carrier identity, or the system may be operated non-anonymously.

Various methods of electronic communication may be employed by the shipper and the carrier including, Internet communication, dial-up network communication, e-mail, electronic data interchange (EDI), interactive voice response (IVR or telephony) or facsimile (fax) transmission from facsimile machines or personal computers.

The system offers various reports including an electronic "best 7" report of the seven lowest-priced bids and/or rates or multiples of seven to ship a particular load, a shippers' bulletin board of available load offerings, and a carriers' bulletin board of available invitations for bids and/or rates.

Online data entry is restricted to authorized users only and data transmissions may be encrypted to ensure security.

Other objects and advantages of the invention, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore, reference is made to the claims that follow the description for determining the scope of the invention.

BRIEF DESCRIPTION OF THE DRAWINGS

FIGS. 3a-3b illustrate a simple request for bids, rates and communication (RFB) form of a type that would be displayed on the screen of a computer connected for communication with the central processing system of FIG. 2;

FIGS. 3c-3m illustrate a complete request for bids, rates and communication (RFB) form of a type that would be displayed on the screen of a computer connected for communication with the central processing system of FIG. 2 with the understanding that RFBs with more or less information as shown in either of these examples of the simple or the complete RFB are possible depending upon the requirements of the shipper;

FIG. 4 is an invitation to bid, rate and communicate (ITB) form of a type that would be displayed on the screen of a computer connected for communication with the central processing system of FIG. 2;

FIG. 5 is a bid and/or rate summary report (Best 7) of a type that would be displayed on the screen of a computer connected for communication with the central processing system of FIG. 2;

FIG. 7 is a carrier's bulletin board of a type that would be displayed on the screen of a computer connected for communication with the central processing system of FIG. 2 with the understanding that additional buttons linking to other service providers, services, shippers and carriers can be included with those buttons shown as well as other sorting and/or filtering parameters;

FIG. 9 is a shipper profile form to be completed by the shipper either on paper forms and faxed for computer entry or on a form that would be displayed on the screen of a computer connected for communication with the central processing system of FIG. 2, both of which are used to input shipper data into a database in the central processing system of FIG. 2; and FIG. 10a-10e illustrate portions of a carrier profile form to be completed by the carrier either on paper forms and faxed for computer entry or on a form that would be displayed on the screen of a computer connected for communication with the central processing system of FIG. 2, both of which are used to input carrier data into a database in the central processing system of FIG. 2.

Figure 1:
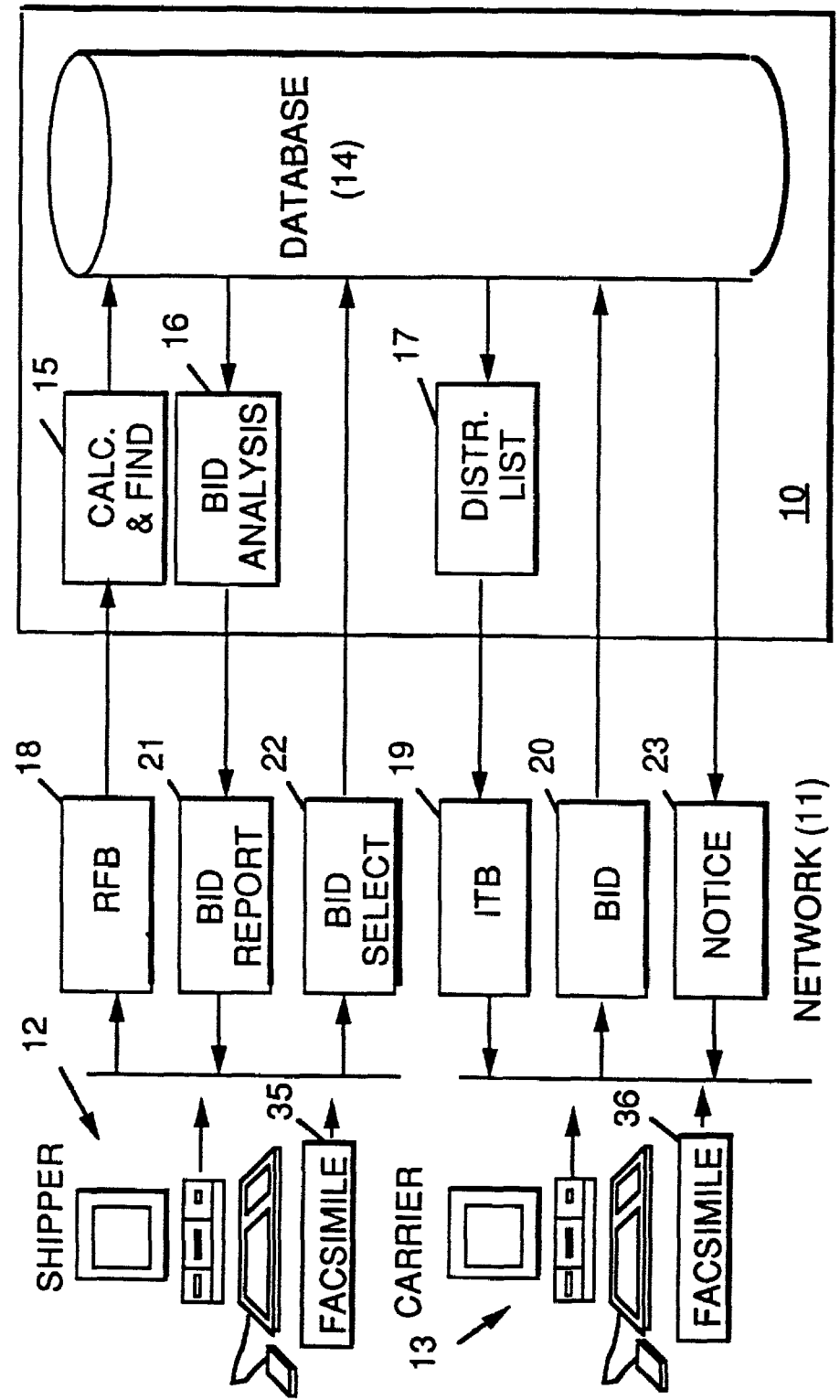
FIG. 1 is schematic diagram of the method of the present invention.

Any or all of the aforementioned figures can be customized for individual shippers and carriers with including but not limited to personalized corporate names, logos, column titles, number of columns, cell names, etc.

DETAIL DESCRIPTION OF THE PREFERRED EMBODIMENT

The term "bid(s)" used throughout this application refers to either a rate(s) (amount for lane and/or freight carriage set by carrier(s) or set (fixed) by established contracts between an individual shipper(s) and carrier(s)) or refers to an actual bid(s) by a carrier(s) to move freight or purchase products and/or services as requested by a shipper(s) separate from any predetermined rate.

The term "corporation" includes both companies and individuals on the system which when using the system are considered to be either a shipper or a carrier. A corporation can be either a shipper or a carrier at any particular time depending entirely on how it is using the system.

Shippers include: (But are not limited to)
Shipper (Corporation offering loads or freight to be moved by carriers)
Shipper (Corporation offering/requesting one or more legs of a tour to another shipper)
Shipper (Corporation offering their own fleet equipment to other shippers or carriers)
Shipper (Corporation offering product(s) for purchase by others)
Shipper (Corporation offering service(s) for purchase or utilization by others)
Third Party Logistics Company (3PL) with shipper agency singularly or in a group
3PL offering/requesting one or more legs of a tour to another 3PL
Broker/Broker Carrier/Freight Forwarder with shipper and/or carrier agency
Carrier (Requesting an Interlining Carrier for a load)
Carrier (Offering Equipment to shippers and/or carriers)

Container Company (Offering Full and/or Empty Containers to shippers or carriers)

Warehousers (Corporations offering their fleets and/or services)

Carriers include: (But are not limited to)

Carrier (Corporation offering truckload (TL) and/or less-than-truckload (LTL) service)

Carrier (Corporation full container load (CL) or less-than-container load (LCL) moves)

Carrier (Corporation moving empty containers for container company)

Carrier (Corporation address one or more legs of a tour)

Third Party Logistics Company (3PL) with carrier agency singularly or in a group Third Party Logistics Company (3PL) addressing one or more legs of a tour Broker/Broker Carrier/Freight Forwarder with shipper and/or carrier agency Shipper (Corporation as a Fleet Truck carrier)

Shipper (Purchasing Products)

Shipper (Purchasing or utilizing Services)

Container Company moving container load (CL) and less-than-container load (LCL)

Warehousers (Corporations offering to move and/or store freight)

The term "shipper" of the freight also refers to the origination party, destination party (consignee) or third party.

The terms "shipper" or "carrier" also refer to or include both the singular and the plural of each respectively.

The term "tour" refers to a total freight movement of more than one leg, ideally a round trip allowing for efficiencies through optimization of time, equipment and costs (i.e.: Origin City Milwaukee, Wis. to Dallas, Tex.; then Dallas, Tex. to Atlanta, Ga.; followed by Atlanta, Ga. back to Milwaukee, Wis. as the final destination city.) These legs of the tour can be created through a combination of different shipments from different shippers.

The system and method services will include but are not limited to offering a unique/proprietary transportation tool as an internet engine/platform utility allowing for the communication of freight transportation information between thousands of participants simultaneously on a national and international basis addressing basic or complete load/loading specification, basic or complete carrier/equipment qualification, rates/bidding on single/multiple loads/equipment/products/services, tours/optimization, equipment availability, and other related services.

Strategic alliances/partnerships/joint ventures with other companies offering industry internet services will address areas such as tracking, tracing, proof of delivery, order visibility, warehouse fulfillment, accounting and procurement functions will all be integrated into the system through the master bulletin board approach. Complete process integration will address and document inter-application along with user communications permitting the various computer languages and infrastructures to transfer data.

The system and method as a communication utility will allow companies to address their clients directly through their own customized Private Access Network (PAN) internet sites/corporate logos/identities with the system with or without alliances remaining in the background while remaining open to other PAN's as well as the open networks. The "brick and mortar" companies retain their autonomy and control relative to their business offerings and their clients.

FIG. 1 shows a central processing system 10 that is connected via an electronic network 11 to many shippers and carriers. For the purpose of FIG. 1, a networked computer 12 is shown for one shipper and another networked computer 13 is shown for one carrier, it being understood that many other shippers and carriers can be similarly connected. These computers 12, 13 can be operated with Windows operating systems available from Microsoft and include a Web browser application for communication on the Internet. Of course, it is understood that other types of operating systems supporting Web browser applications can also be employed. And in alternative modes of operation, the computer 12, 13 are operated with computer-generated or facsimile machine 35, 36 transmitted forms in a non-browser environment, and the data from these forms is transmitted in data files or facsimile files by e-mail or by a dial-up type of network or interactive voice response (IVR).

In any event, the shipper and the carrier first submit data to initialize the database 14. For the shipper this is largely shipper identification data, shipper traffic department type data, shipper employee size data, shipper revenue size data, and shipper financial data. For the carrier this includes data such as but not limited to carrier identification data, carrier equipment data, carrier financial condition data, carrier service data, carrier service area data, carrier driver data, carrier hazardous license data, carrier insurance data and carrier rules and charges data. This data has been compiled in a database 14 stored and operating in the central processing system 10. Associated with this database are certain groups of logic or program instructions represented by blocks 15, 16 and 17 in FIG. 1.

A transaction using the method or process of the invention is initiated when the shipper 12 creates and then transmits a request for bids, rates and communication (RFB) 18. The RFB 18, along with the carrier data, is processed utilizing a calculate and find logic block 15 to 1) calculate mileage distances for shipment, if desired by the shipper 2) to find a number of "qualified carriers" that meet the shippers requirements or that are on a list of carriers for the load or load type who should receive the invitation to bid, rate and communicate (ITB) 19, and 3) to develop the invitation itself. The ITB 19 is then automatically electronically transmitted according to a distribution list 17 of qualifying or specifically requested carriers 13, without the carrier initiating communication with the computer system. These carriers 13 receive the ITB 19 that is accessed through the carriers' bulletin boards, and have the option to submit a bid and/or rate. If they complete the bid, rate and communicate (ITB)form, this is electronically transmitted as a bid and/or rate 20 to the central processing system 10. The central processing system 10 then analyses the bids and/or rates, dollar amounts being positive, zero or negative, by executing logic block 16 to select a group of the "best seven" bids and/or rates. The number of selected bids is, or course, variable and optional, but the number seven is the group size shown in a "Best 7" 21 bid and/or rate report on a typical open network. However, additional groups of seven bids and/or rates can be seen beyond the initial seven (e.g. fourteen bids, twenty-one bids, twenty-eight bids, etc.) can be shown on private access networks (PAN). The bids and/or rates included in the "Best 7" report 21 then is automatically electronically transmitted to the shipper 12, without the shipper initiating communication with the computer system. The shipper 12 receives the "Best 7" report 21 which is accessed through their bulletin board and then has the option to indicate a bid and/or rate selection 22 of one of the bids and/or rates and electronically transmit that bid and/or rate selection 22 to the central processing system 10. The central processing system 10 will, in turn, electronically communicate a notice of the bid and/or rate selection 23 to the shipper 13 which includes the name and telephone number of the carrier, if this is a group of anonymously communicating shippers and carriers. On the private access networks (PAN) the carriers are aware of the name of the shippers prior to submitting bids and/or rates and the carriers names are revealed to the shippers on the best 7 reports prior to the shippers making the final carrier selections.

Figure 2:
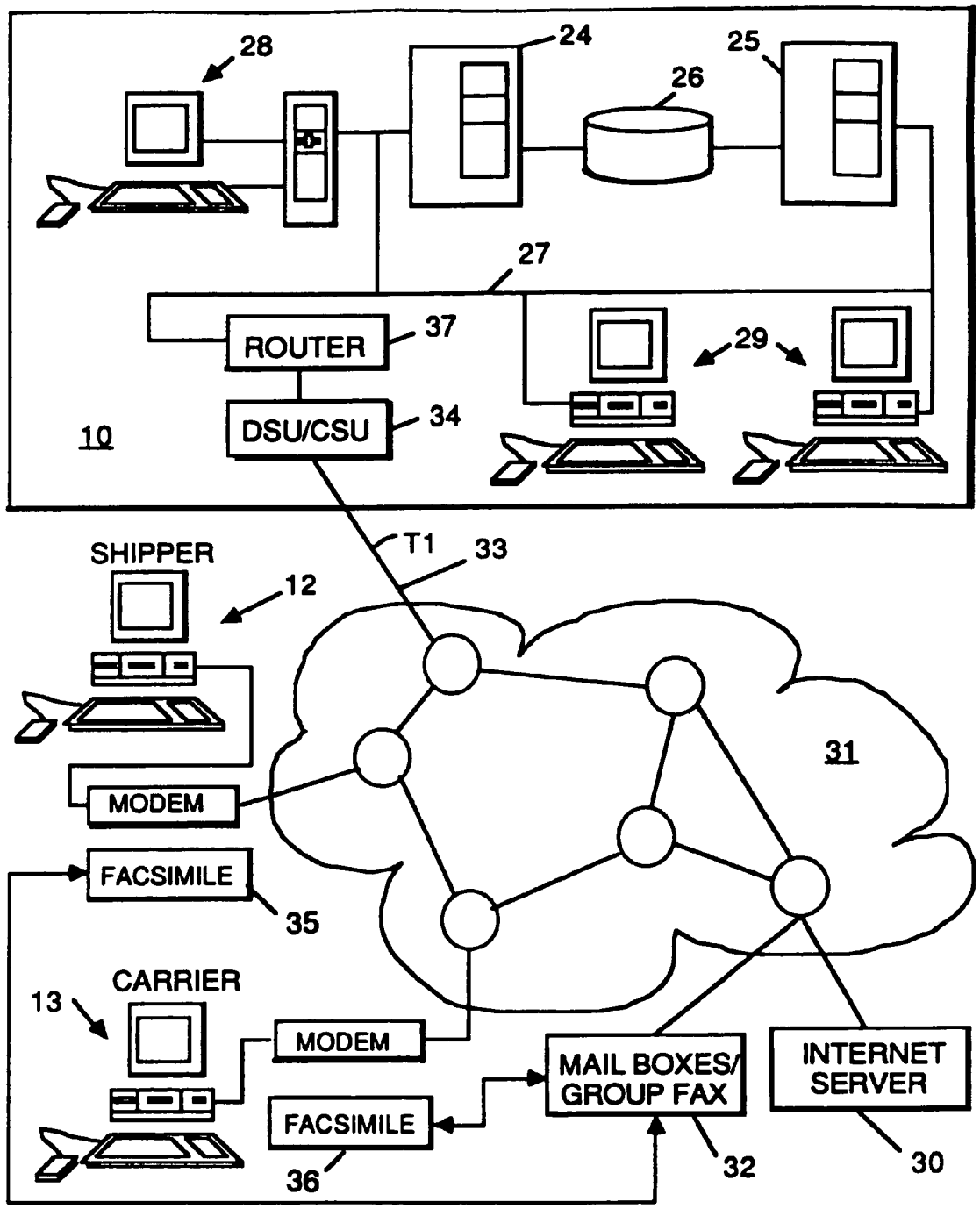
FIG. 2 is a block diagram of the central processing system and network used to carry out the method of FIG. 1.

Referring next to FIG. 2, central processing system 10 more particularly includes two or more CPU's 24 and 25, operated as database host computers, which are connected to a disk memory system 26 available from Sun Microsystems (Sun), Hewlett-Packard (HP), International Business Machines (IBM), Data General (DG), etc.. The CPU's 24, 25 operate with Unix (i.e.: DG, HPUX, AIX (IBM), etc.), NT (Microsoft), Linix, Solaris Intel, Solaris Sparc, etc. operating systems. The database 14 (FIG. 1) is provided by a database management application program (DBMS), such as the various Oracle versions. The blocks of logic 15, 16, and 17 represented in FIG. 1 include application routines written in the C, Pearl, JAVA Script, SQL, HTML, Dynamic HTML, XML, etc. programming language to supplement routines available for the Oracle DMBS 14.

The database host computer 24, 25, 26 are connected to a local area network (LAN) including network media 27, a network server computer 28, operating under a Novell, NT, etc. network operating system and a plurality of client desktop computers 29 running the Windows 95, 96,97, 98, 2000 operating systems available form Microsoft among others and including Web browser applications for communicating on the Internet.

In this particular embodiment, an Internet (Worldwide Web) server 30 is provided by Internet Service Providers (ISP), at sites remote from the database host computers 24, 25, 26. It would, of course be possible, and is considered within the scope of the invention to provide a Web server at the same site as the database host computer 24, 25, 26. And while it is conventional in the e-commerce industry today to provide databases in separate CPU's running behind a firewall in the Web server 30, it is contemplated that the invention could be practiced on a single computer or CPU having sufficient capacity to perform all of the Web communication and database functions described herein.

For the purpose of completing the description of the third party Web hosting arrangement, the Web site server 30 is connected via the World Wide Web 31 (also known as the Internet) to personal computers 12, 13 located with the shippers and carriers as shown in FIG. 1. The system 10 can also utilize e-mail, represented by e-mail mailboxes 32 at the Web site to transmit files between the shippers 12 and carriers 13 and the central processing system 10. The mailboxes 32 are accessible for periodic access, and uploading and downloading of e-mail through an interface including a T1, T3, fiber optic, etc. line 33, a data service unit/channel service unit (DSU/CSU) 34, which is a computer network to phone line interface, and a Cisco, etc. router 35 which connects the DSU/CSU 34 to the LAN 27, 28.

The shippers and carriers 12, 13 can access the mail boxes either through the World Wide Web 31 using the Internet protocols or through dial-up facsimile data transfer. In the second instance, the shippers and carriers can transmit a file of facsimile data to the e-mail mailboxes 32 using either a personal computer 12, 13 or a facsimile machine 35, 36. The central processing system 10 transfers data to and from the Web server 30 and to and from the e-mail mailboxes 32 and receiver data from the group fax facilities 32 of the Web host site, which are also accessible by the shippers and carriers 12, 13. Data transfer can also be direct without the use of mailboxes.

Referring to FIGS. 9 and 10a-10e, certain data from the shippers and carriers is pre-installed in the database 14. FIG. 9 illustrates a shipper profile form. In first and second areas 38, 39, the shipper submits shipper profile data identifying the shipper, providing phone numbers, e-mail addresses and facsimile numbers, a security authorization number. In third and fourth areas 40, 41, certain size and financial data is provided. In the bottom area 42, the "shipper" confirms its identity as a shipper or another type of freight business. As used herein, "shipper" means any of the types of listed types of freight businesses operated on the system in the capacity of a "shipper" as described herein. The shippers may also list any companies and/or individuals with whom they will not do business.

FIG. 10a-10e illustrates a multi-page carrier profile data form which on the first page (FIG. 10a) identifies the carrier, and provides phone numbers, e-mail addresses and facsimile numbers, a security authorization number, and certain financial and size data. One the second page (FIG. 10b), safety information, insurance information, geographic areas of operation, and types of services offered are provided along with information on the types of loads handled and type of carrier. As used herein, "carrier" means any of the types of listed members operated as a "carrier" on the system described herein. The third page (FIG. 10c) provides a commodity code listing for indicating the commodities desired for carriage. The fourth page (FIG. 10d) provides a matrix for identifying types of trailer equipment. It is noted here that the term "load" as used herein contemplated not only full trailer loads, but also partial trailer loads and container loads. The fifth page (FIG. 10e) provides for entry of carrier rules and charges. The identification of this data for the carrier profile is meant to be exemplary but not exhaustive. The carriers may also list any companies and/or individuals with whom they will not do business.

There are also simple and complete Request For Bid (RFB) formats for shippers to enter information on load/loading/ equipment/carrier requirements for carriers to review. Each format includes drop boxes for selecting alternative options, eliminating individual key stroke entries for the multiple offerings. All numbers can be indicated in English or metric system to relate with international carriage. Multiple languages can be accommodated.

Figure 3C:
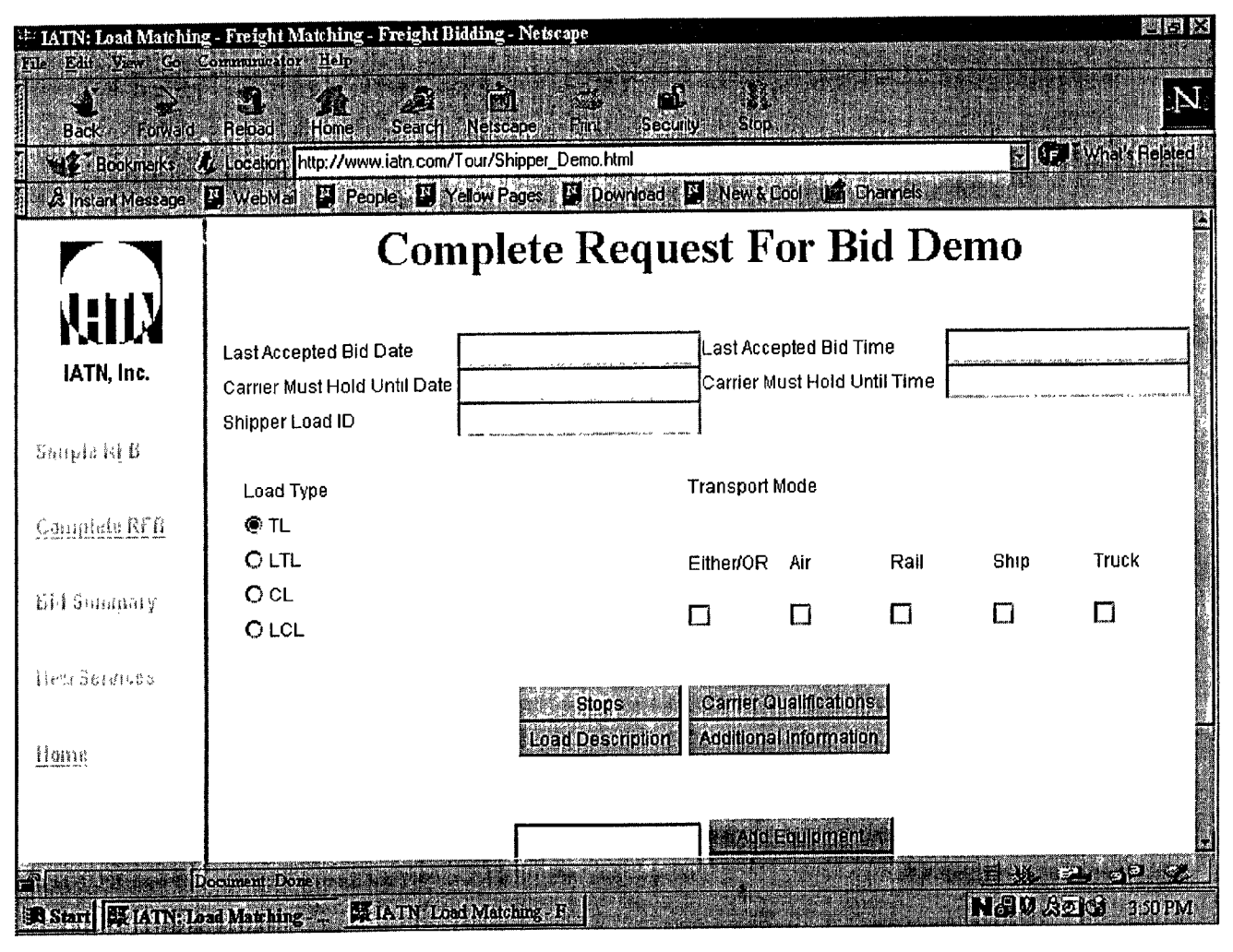
Figure 3D:
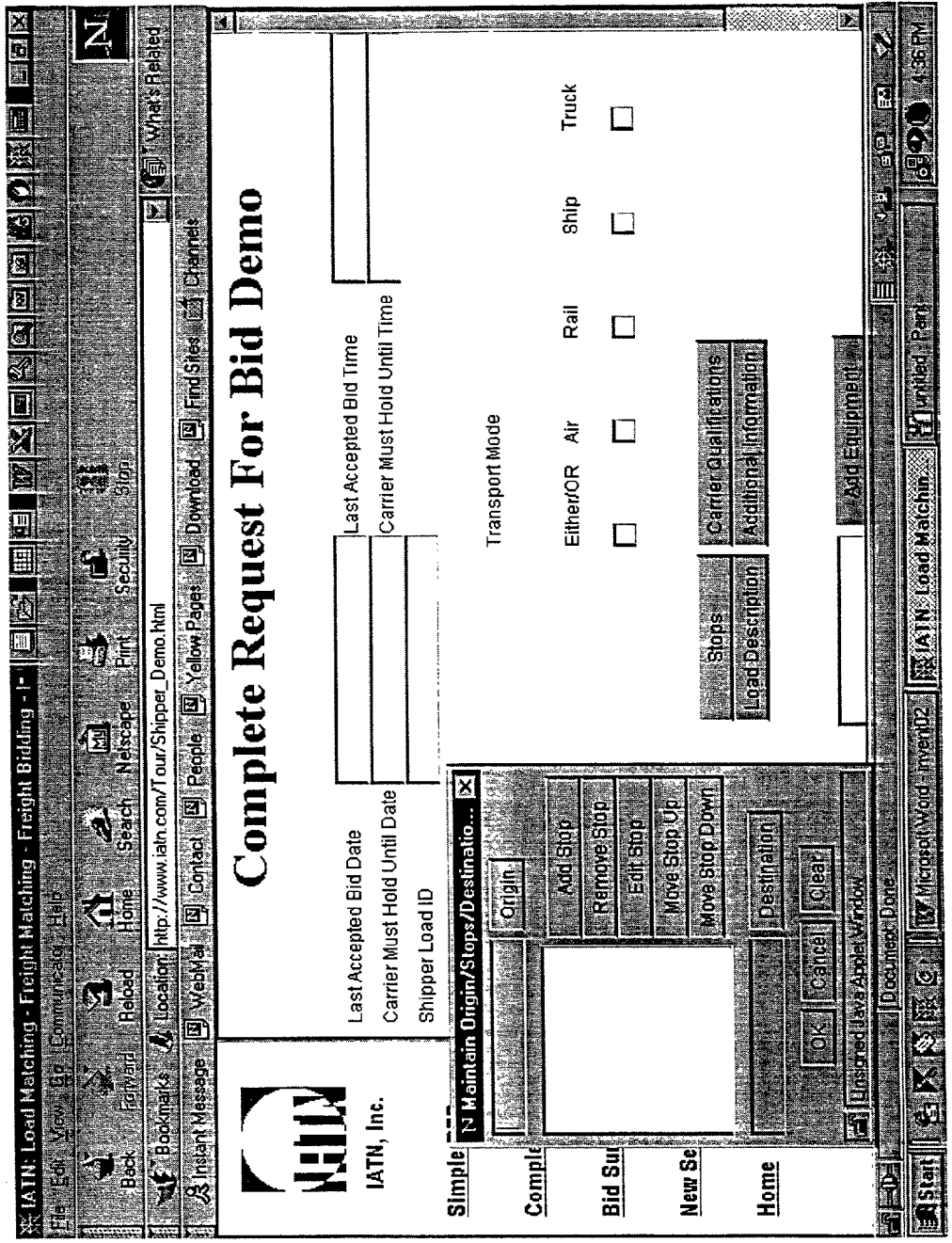
Figure 3E:
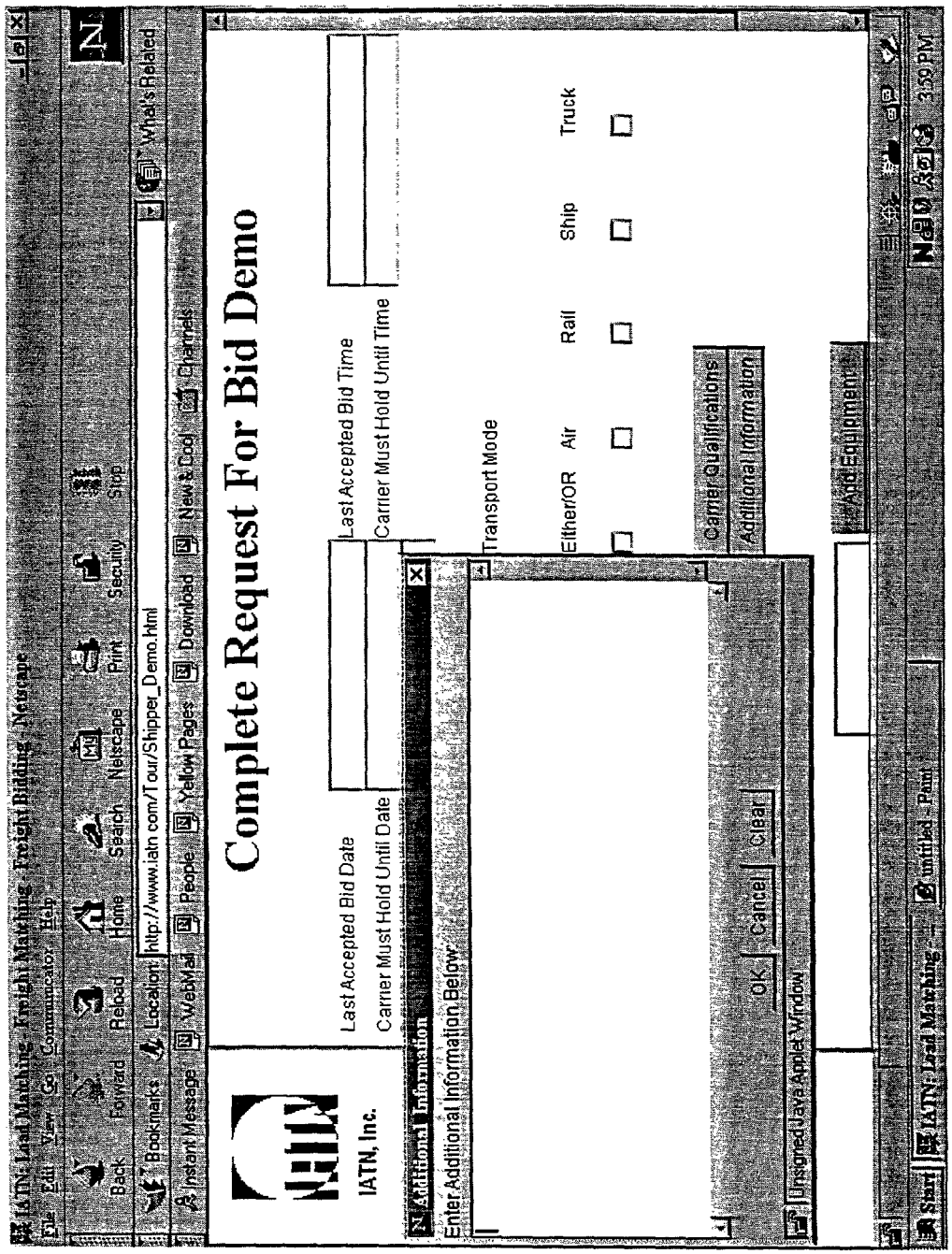
Figure 3F:
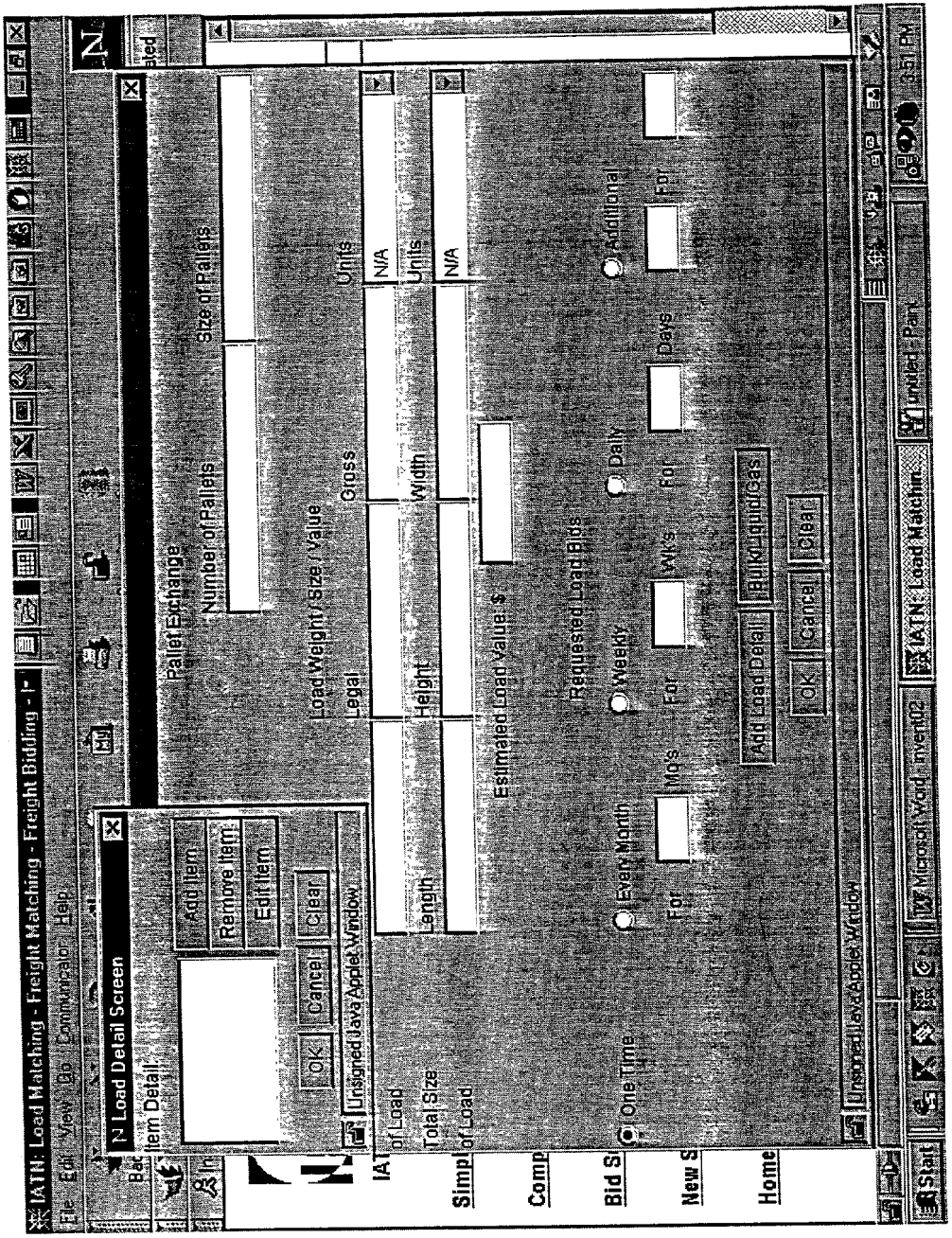
Figure 3G:
Figure 3H:
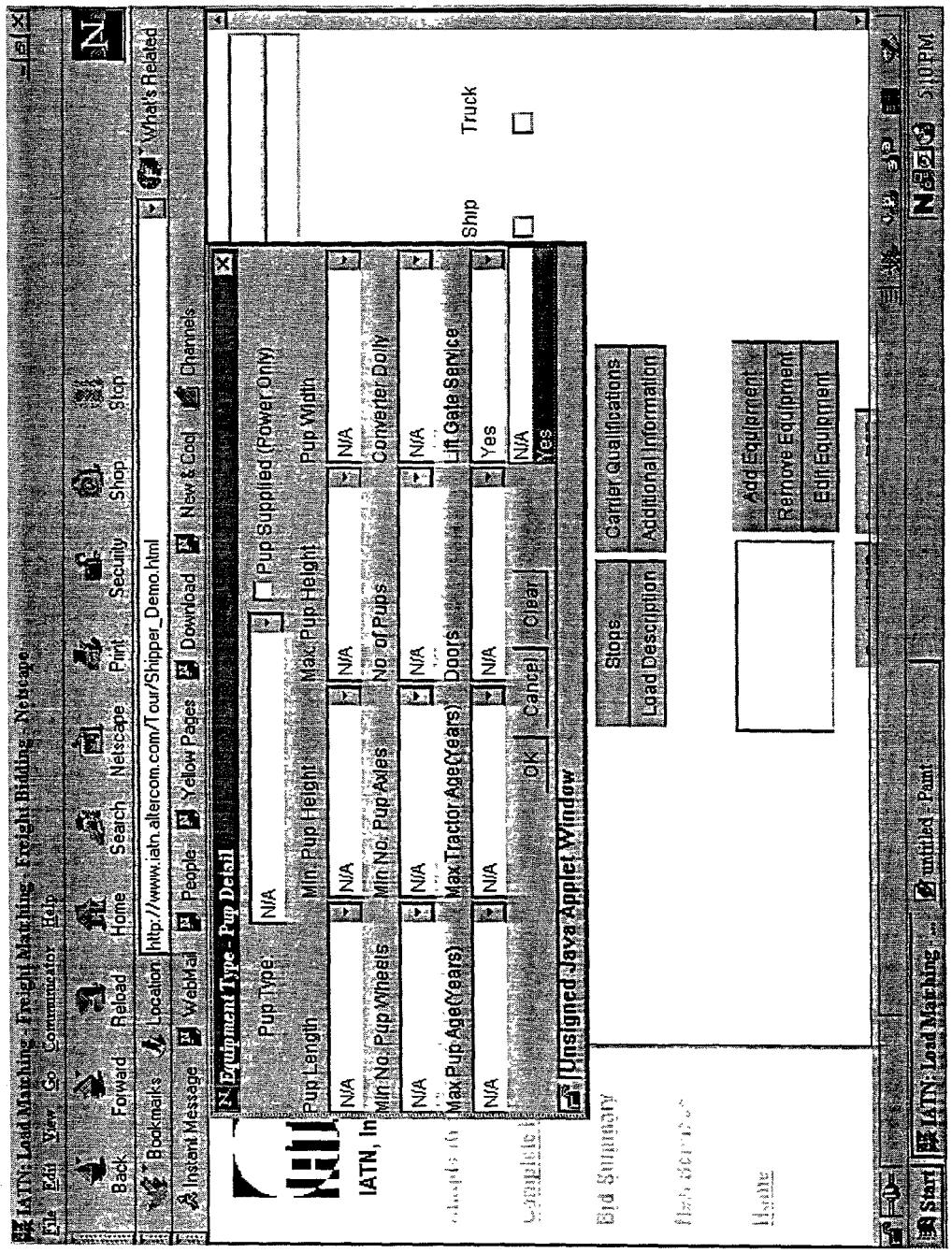
Figure 3J:
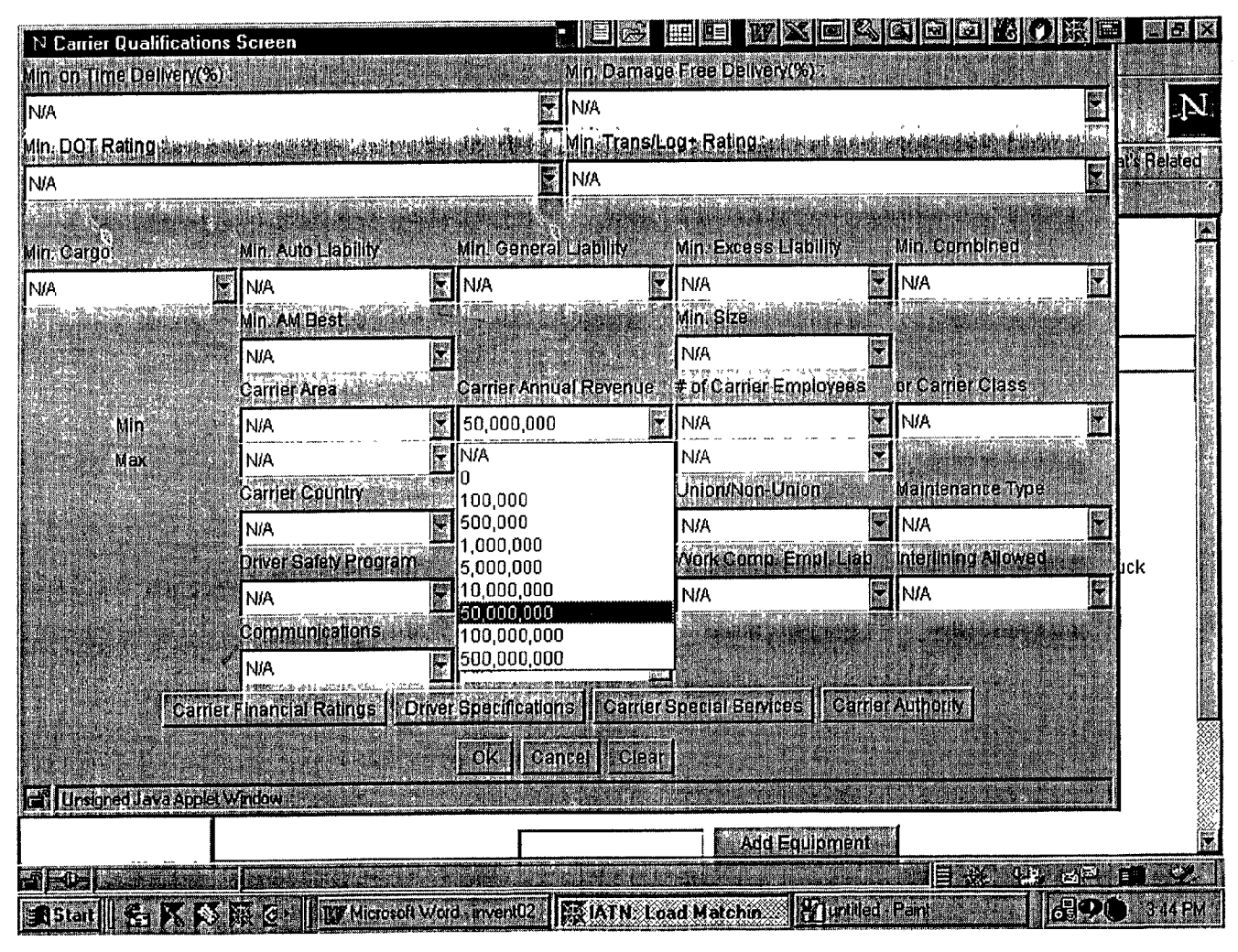
Figure 3K:
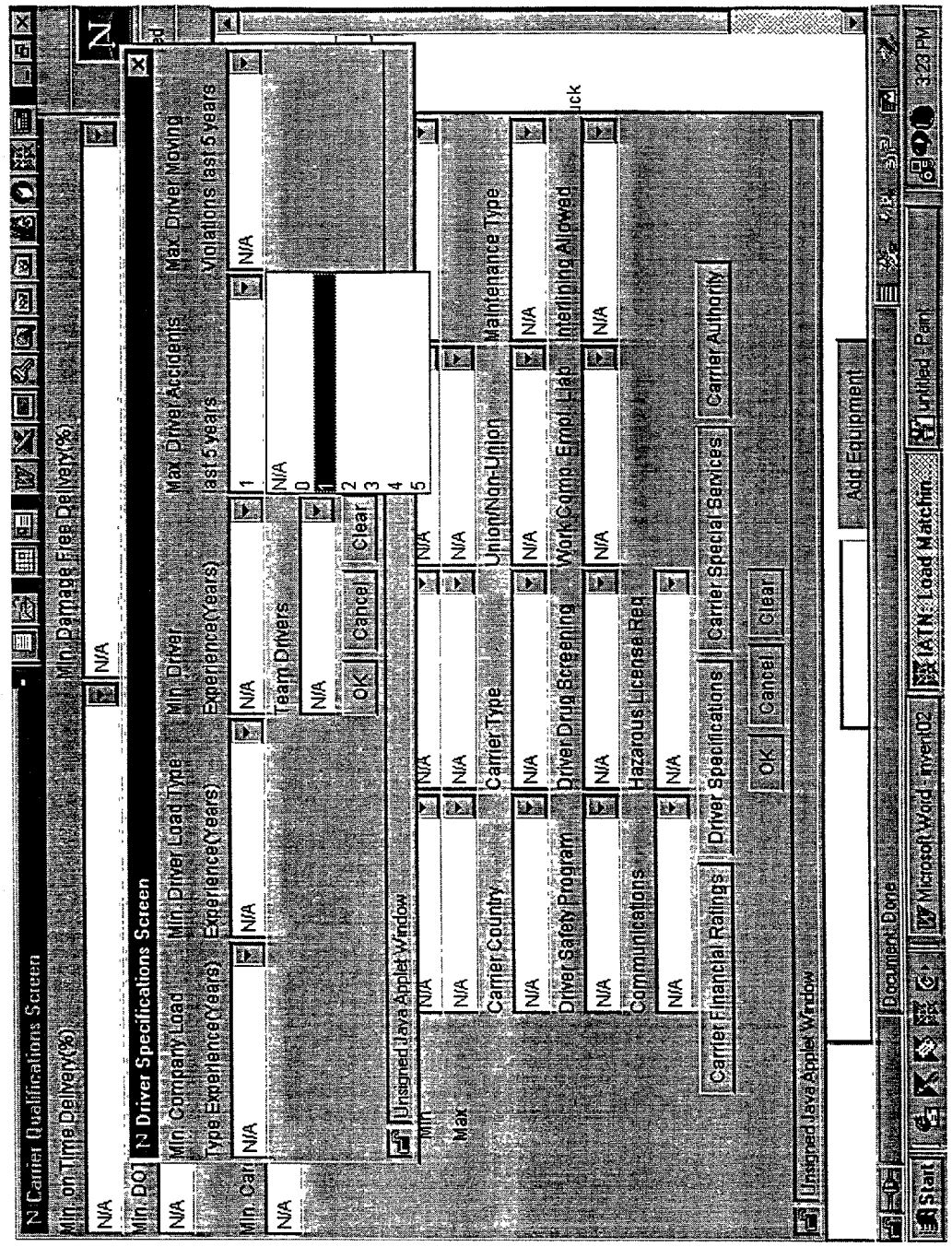
Figure 3I:
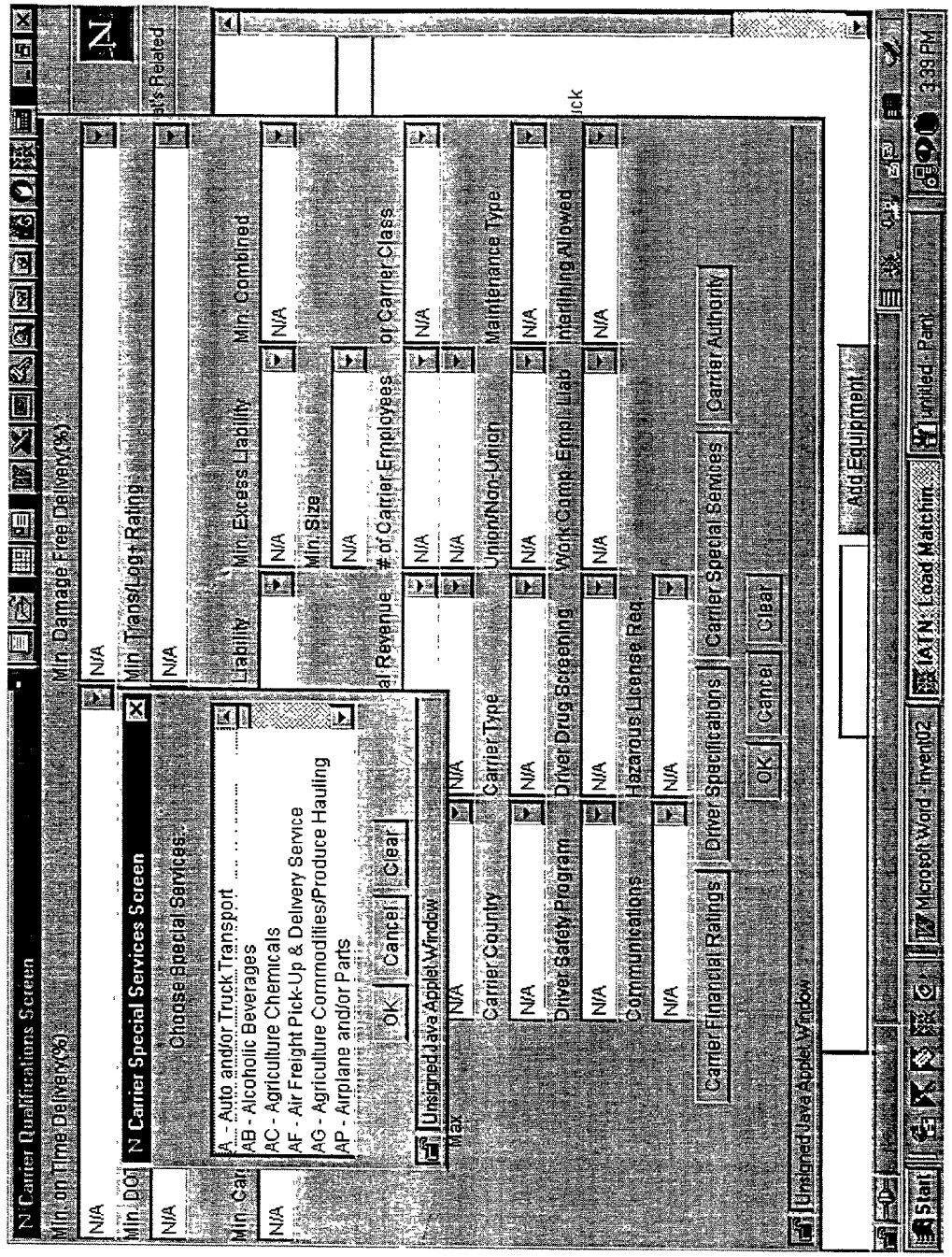
Figure 3M:
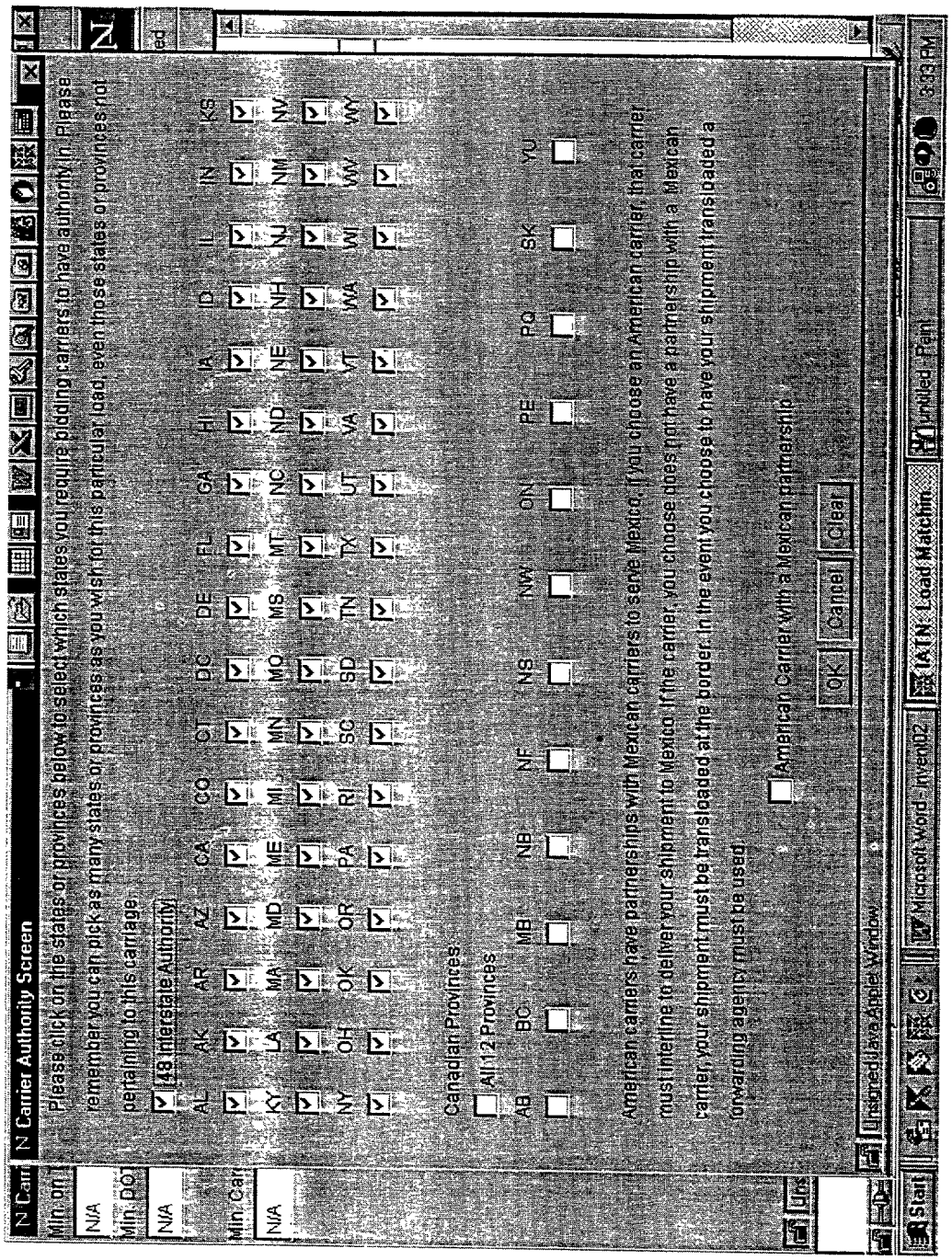

Referring next to FIGS. 3a-3m, the system and method of the present invention begins operation when a shipper 12 creates and submits a request for bids, rates and communication (RFB) 18 to ship a load. A simple RFB 18 of the type displayed in a window of a Web browser page as seen in FIGS. 3a and 3b. In the upper area 45, labeled "Load Description" are data entry boxes or pull down menus for entering data describing the commodity being shipped, the shipper load ID, the weight of the load and the number of units, the number of times to ship the load (if multiple shipping is desired), maximum acceptable bid or rate limit in dollars, a matching method for determining which carriers can view the RFB (normal (qualified carriers), affiliated carriers (only, excluded or specific), or open bidding (all carriers)), the shipper's last acceptance date and time (mm/dd/yy and 24 hour local hh:mm) for the carrier to submit the bid or rate, the date and time (mm/dd/yy and 24 hour local hh:mm) as dictated by the shipper through which the carrier must hold open the bid or rate, a pallet exchange indication if required, the number of pallets to be exchanged, whether or not the maximum acceptable bid or rate limit should be shown to bidders in the ITB and a distribution list code (references the actual lists of names of those carriers permitted to see the information relative to the RFB).

In the next area 46, labeled "Load Destinations", there are a number of rows with boxes and pull-down menus for entering data designating origin and destination (city, state, country and zip or postal code), preferred pickup and delivery dates and times (mm/dd/yy and 24 hour local hh:mm) with plus and/or minus hours or minutes (hh:mm) for earlier or later allowable pickup or delivery timeframes, and intermediate stops (locations between the origin and destination along with similar pertinent information).

In the next area 47 FIG. 3b, labeled "Carrier Requirements" there are check boxes for load type (TL, LTL, CL, LCL), transit mode . . . for minimum cargo insurance (i.e.: N/A to $10,000,000).

In the next area 48 (FIG. 3b), labeled "Equipment Requirements" there are pull down menu list boxes . . . equipment height and equipment width.

The next area 49 provides a text entry box for further descriptions, directions, addresses, telephone numbers, load and loading information and or specifications, etc.) Data files can be downloaded into this additional information box from the shippers database or files eliminating the need to enter this information via individual keystrokes. Also, individual name, address, number boxes can be added as a customization to the simple RFB if desired by the shipper.

At the bottom of the form are buttons 43, 44 to indicate done or that the form is complete or to clear the form.

The Complete RFB has the aforementioned information as in the Simple RFB but also the following elements: additional countries, union or non-union, carrier area (intrastate, regional, national, international), carrier type (common, dedicated contract, exempt, fleet, independent, specialty), carrier annual revenue (1 to over 500 million) carrier class (1, 2, 3), carrier size (1 to over 100,000), on-time delivery (50% to 99%), damage free delivery (50% to 99%), special services (extensive list), Dun & Bradstreet with CCA rating, Moody's rating, standard & Poor's rating, Department of Transportation (DOT) rating, IATN rating, carrier insurance (auto liability, general liability, combined, cargo, excess liability), Best Company insurance ratings and size, workers compensation and employee liability, van trailers (aluminum, FRP, plate, can), number of trailer wheels, number of trailer axles, extendibles, tandems, doors (overhead, swing, side), lift gate service, number of trailers, heated, sleeper tractor, equipment maintenance (in-house, external), pup (similar to trailers), converter dolly, container (similar to trailers), straight chassis, age of equipment (trailers, pups, containers, tractors), carrier load type experience (years), driver experience (driving, load type, accident rate, moving violations, all in years), driver safety program, drug screening, packaging (cardboard, plastic, metal, glass, wood, bulk, drum, tank, other), load method (slip-sheet, palette, skid, individual, shrink-wrap, strap, shelf, other), size of pieces or pallets (length, width, height), weight of pieces or pallets (net weight, legal weight, gross weight), NMFC class and density of pieces or pallets (1/500 to 50/50), total size of load (length, width, height), method of securing load (straps, brackets, ropes, canvas, pads, chains, gates, other), bulk loads (cubic volume, weight), liquid loads (volume), gas loads (volume), NAFTA and Global Harmonized Tariff Schedule, load and count (shipper, driver, lumpers and time), unload and count (consignee, driver, lumpers and time), requested load bids (times per day, week, month for number of days, week, months), additional load requirements (mobile storage, warehousing, local pickup and delivery, break bulk, consolidation, trailer spotting, trailer shuttle. The aforementioned are shown in FIG. 3c through FIG. 3m.

It should be understood that term "request for bids, rates and communication" may include requests for bids and/or rates with more of less than the above-described information on either the simple or complete RFB.

When the RFB 18 is transmitted electronically to a mail box or directly or faxed, as previously discussed in relation to FIG. 1, an ITB 19 is developed at the central processing system 10 and transmitted to carriers 13. An example of the ITB form 18 is seen in FIG. 4. At the top of the form in a first area 50 is a logo, name, phone and fax number for the proprietor of the invention and a reference number for the transaction. In a second area 51, there is a bid and/or rate entry box, a submit bid and/or rate button and the last accepted bid and/or rate time. The load origin, destination and any stops are then listed in area 52. This is followed by an area 53 with shipper profile information, but not the identity of the shipper. This is followed by an area 54 with load type and transport mode type form the RFB 18. This is followed by any specification 55 on trailer equipment. This is followed by additional information 56 including, the commodity to be shipped, the time for which the bid and/or rate must be held open, the number of pallets involved and with of the load. It should be understood the term "invitations for bids, rates and communication" may include invitations for bids and/or rates with more or less than the above-described information.

A carrier responds to the ITB 19 by entering a bid and/or rate amount in the bid and/or rate entry box 57, and activating the submit bid and/or rate button 58 to transmit the form, which now includes the bid and/or rate data, back to the central processing system 10 via the Internet or one of the alternative modes described above. This becomes the bid and/or rate 20 represented in FIG. 1. In contrast, when carriers enter bids and/or rates for moving empty containers or purchasing products or services, etc., additional information boxes such as number and unit amounts are provided on other bid/rate ITB forms and must be filled in prior to a bid and/or rate being submitted. These forms can also allow the carrier to indicated how long, by date and time, the bid and/or rate will be held.

Figure 7:
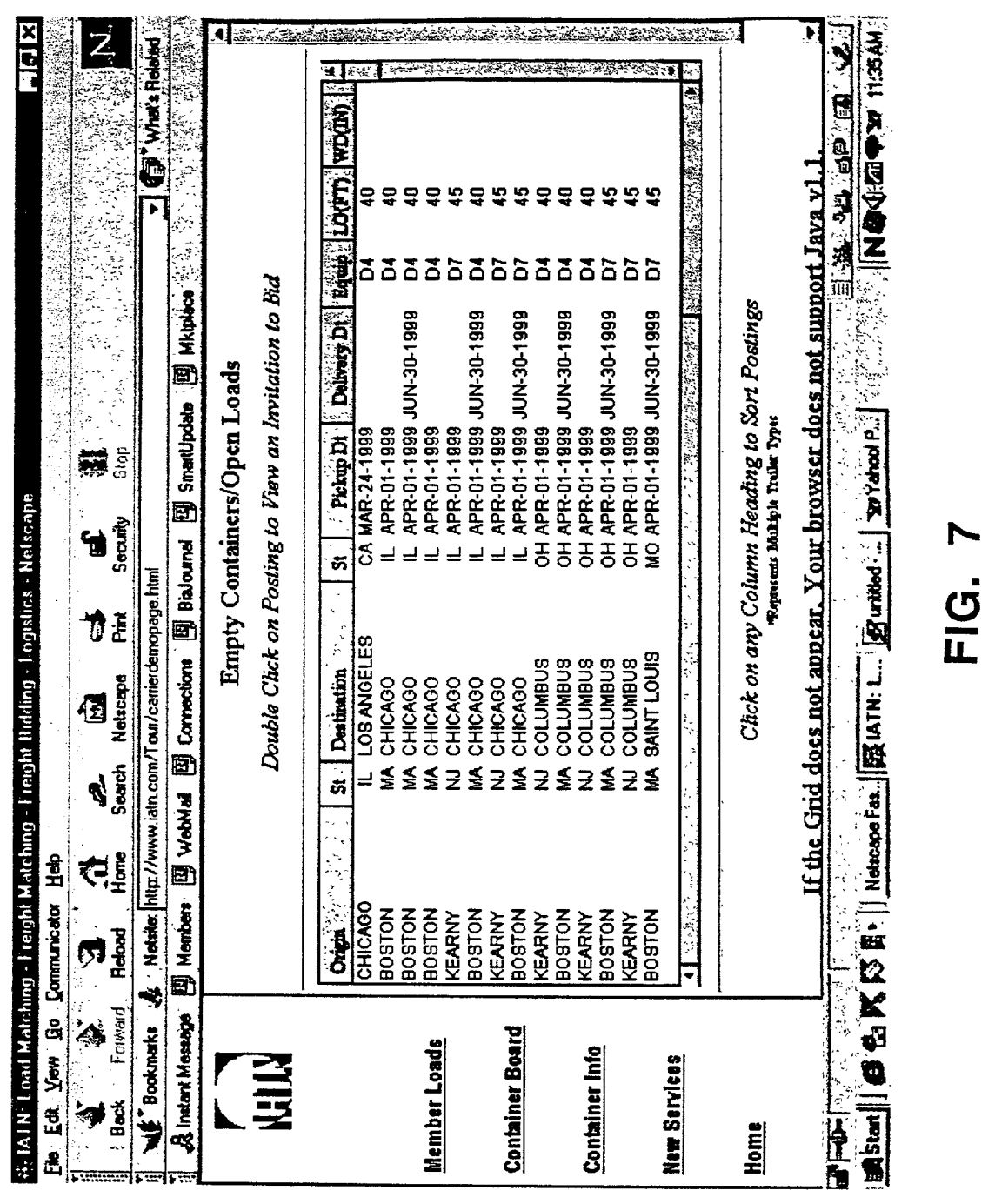

In one variation of this method and system, the ITB 19 is transmitted to a third party/broker in a group of load listings known as a carrier's bulletin board, which is shown in FIG. 7. When a line in the bulletin board is selected and activated in the from in the browser window, an invitation to bid and/or rate for as shown in FIG. 4 can be viewed. The third party can then offer the load to one or more selected carriers, add any markup or service fee and submit the bid and/or rate to the central processing system 10. Of course, where there is not third party/broker, such a bulletin board could also be viewed directly by a carrier 13.

Figure 6:
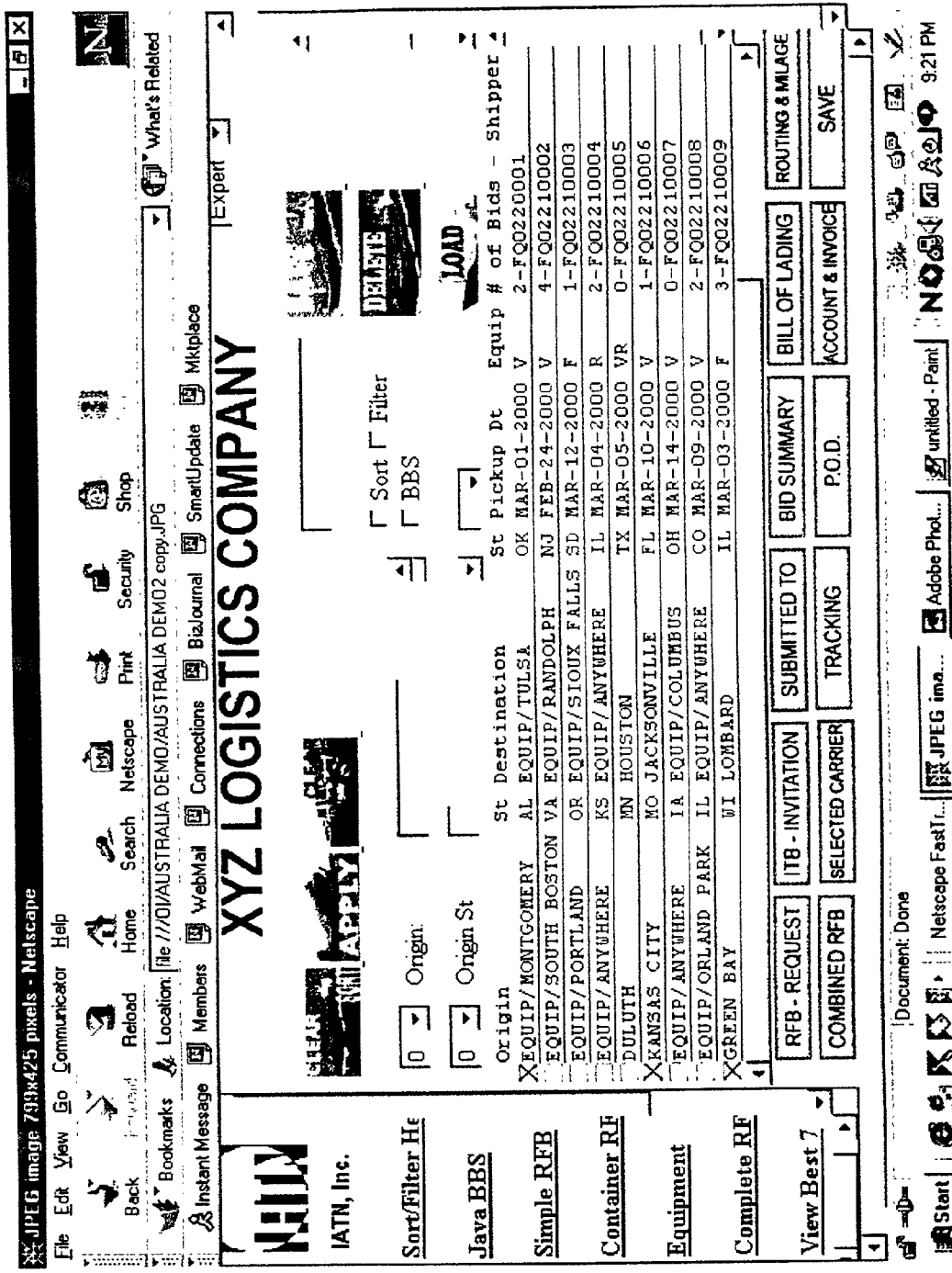
FIG. 6 is a shipper's bulletin board of a type that would be displayed on the screen of a computer connected for communication with the central processing system of FIG. 2 with the understanding that additional buttons linking to other service providers, services, shippers and carriers can be included with those buttons shown as well as additional sorting and/or filtering parameters.

FIG. 6 illustrates a shipper's bulletin board in which each line represents and invitation to bid and/or rate 18 and a bid and/or rate report 21.

The simple or basic bulletin board columns, features, system/network integrations include but are not limited to: 1. Origin/destination city/state, pickup/delivery date/time, stops, commodity, equipment type/length, load weight, price, shipper/carrier numbers and IATN Trans/Log+numbers. 2. Sort load/equipment by column headings in order of preference (i.e.: 1, 2, 3 . . . 10, etc.). 3. Filter loads/equipment by actual city and/or state names, etc. (i.e.: Atlanta, paper, airride van, 53 ft., etc.). 4. Enter individual loads/equipment by individual key strokes one load at a time or enter multiple loads (10, 100, 1000, etc.) in batches automatically by electronic transfer from computer databases onto Request for Bids, Rates and/or Communication Forms (RFB). 5. Invitation to bid, rate and/or communicate form (ITB) with additional load/loading/location/etc. information as needed allows the carrier to submit a rate or bid, both which indicate all important equipment availability. 6. Best 7 forms returned to the shipper indicates from 0 to 100+ carrier rates/bids per load request in sets of seven along with the carriers' qualifications, rules and charges, names, etc. for final carrier selection by the shipper. Internet software applications offered by other service providers and/or member (shippers and/or carriers) system users that can be integrated into the system include but are not limited to procurement, order entry, tracking, tracing, proof of delivery, order visibility, warehousing fulfillment, accounting, billing, finance, etc. 8. All files/information can be saved, archived, or deleted as well as utilized to generate reports. 9. Multiple screens can be viewed together to aid in load/equipment optimization. 10. Other users, networks and systems can be accessed through the grand master board via any individual or master board with the proper authorization.

To Sort, Filter, Save, Archive or Delete on a Bulletin Board:

The individual selected bulletin board(s) can be "Sorted" or "Sorted and Filtered" or "Filtered" by DATA: Origin City, Origin State, Destination City, Destination State, Pick-up Date, Delivery Date, Stops, Equipment Type, Equipment Length, Maximum Bid, System Number, etc.

A "Sort" example: A number from 0 to 10 would indicate which column by title (i.e.: origin city, origin state, etc.) is to be sorted on first, second third, etc. on the bulletin board in order of importance to the user for either a load, available equipment, tours, products, services, etc.

A "Filter" example: The ACTUAL city (i.e.: Milwaukee, Chicago, etc.), ACTUAL state (i.e.: WI, IL, etc.), ACTUAL trailer type (i.e.: van, refer, flat-bed, etc.), ACTUAL system number (i.e.: 970501000601100), ACTUAL shipper number (may include the names of individuals, shipper or department identifications, i.e.: bill145567, ibm557922, etc.) etc. defines in more specific detail the items in the columns to be listed first, second, third, etc. on the bulletin board in order of importance.

One can also SAVE the "Sorting" selections and/or SAVE the "Filtering" selections and/or SAVE the "Bulletin Board" itself and/or ARCHIEVE same and/or DELETE same by assigning "File Names" to the operations.

More than one bulletin board can be shown on a computer screen at the same time, either overlaid and/or minimized for viewing. This allows one to treat each board separately but also allows working the boards together for data analysis to maximize the understanding (i.e.: Compare loads with available equipment to find the best match).

To Post & Select Equipment on a Load and/or Equipment Bulletin Board:

Just as shippers can request bids and/or rates for hauling freight from carriers (either the bid or rate showing the price also indicates that the carrier has the required equipment available to complete the carriage), carriers can advertise the availability of their equipment and request bids for the use of their equipment from shippers. Carriers place their available equipment along with any requirements, similar to shippers placing loads with their requirements, on a combined bulletin board (the bulletin board displays both loads and equipment).

Carriers enter information in a Request For Bid format (RFB) the same as shippers enter load information with the exception that in the origin city and destination city locations the carrier adds the prefix "EQUIP/" before the city or before a descriptive area. (i.e.: If a carriers equipment was available in Milwaukee, Wis. and the carrier wanted to move that equipment to Atlanta, Ga. the carrier would enter the following on the RFB: "EQUIP/MILWAUKEE" in the origin city location with "WI" in the origin state location and "EQUIP/ATLANTA" in the destination city location with "GA" in the destination state location.). Carriers can be specific, general or a combination of the two in the origins and/or destinations for their equipment utilization. (i.e.: A carrier could indicate that the equipment is available from a particular state to a particular state by entering "EQUIP/ANYWHERE" in the origin city location along with a particular state in the origin state location followed by "EQUIP/ANYWHERE" in the destination city followed by a particular state in the destination state location.)

Shippers may then view the board to locate equipment that meets their needs available in type, location, dates, etc. The shipper then reviews an invite to bid for the equipment that shows all of the carrier's equipment and/or other requirements. The shipper then can either agree on a fixed rate as dictated by the carrier included in the invite information or the shipper may place a bid amount that the shipper is willing to pay to the carrier to move the freight. Carriers then select the shipper whose load they wish to move at the agreed price. A shipper has the option of opening two or more identical load and equipment bulletin boards so that both are on a computer screen at the same time. One board can be sorted and/or filtered for loads and the other can be sorted and/or filtered for compatible equipment. The shipper can then make equipment selections most appropriate to the specified load requirements without having to go back and forth between separate screens.

To Post Load(s) in a Tour on a Load and/or Equipment Bulletin Board:

Just as shippers can present loads and request bids and/or rates for hauling freight from carriers, shippers can request load(s) from other shippers for a leg(s) of a tour that they are trying to create so as to optimize equipment utilization and driver satisfaction for carriers which will result in savings and additional revenue for the shipper and the carrier respectively.

Shippers enter information in a Request For Bid format (RFB) the same as shippers enter load information with the exception that in the origin city and destination city locations the shipper adds the prefix "TOUR/" before the city or before a descriptive area. (i.e.: If the load desired was to be in Milwaukee, Wis. and the shipper wanted that load go to Atlanta, Ga. the shipper would enter the following on the RFB: "TOUR/MILWAUKEE" in the origin city location with "WI" in the origin state location and "TOUR/ATLANTA" in the destination city location with "GA" in the destination state location.) The entire "TOUR" in this example might be ATLANTA, Ga. to DALLAS, Tex.—DALLAS, Tex. to MILWAUKEE, Wis.—MILWAUKEE, Wis. to ATLANTA, Ga. This allows the carrier to return to the carrier's home base in one round trip. The shipper may option to indicate a rate for moving the requested load.

Shippers would then indicate such loads as being available by submitting a zero ($0) dollar amount as the bid/rate on the invitation to bid, rate and/or communicate screen (ITB). The shippers would then discuss how the carriage should proceed by either requesting carriers to address all legs of the "TOUR" via a new RFB or pre-selecting a carrier who works with either participating shipper. The shippers and the selected carrier all win in the arrangement.

To Post Products on a Combination Master Bulletin Board:

Just as shippers can request bids and/or rates for hauling freight from carriers, selling shippers can advertise the availability of their products and request bids for the purchase of their products from buying shippers. Selling shippers place their available products along with any requirements, similar to shippers placing loads with their requirements, on a combined master bulletin board (this board displays loads, products, services, equipment, tours, etc.).

Selling shippers enter information in a Request For Bid format (RFB) the same as shippers enter load information with the exception that in the origin city and destination city locations the carrier adds the prefix "PROD/" before the city or before a descriptive area. (i.e.: If a shippers product was available in a Milwaukee, Wis. warehouse/distribution center, the shipper would enter the following on the RFB: "PROD/MILWAUKEE" in the origin city location with "WI" in the origin state location and the description of the product "HUNTS Tomato Paste" in the destination city location with "NA" in the destination state location.). Shippers can be specific, general or a combination of the two in the destinations for their products. Quantities, size and unit prices can be included on the bulletin board.

Buying Shippers may then view the board to locate products that meets their needs available in type, location, dates, etc. The shipper then reviews an invite to bid (ITB) for the product(s) that shows all of the selling shipper's product and/or other details/requirements. The buying shipper then can either agree on a fixed rate as dictated by the selling shipper included in the invite information or the buying shipper may place a bid amount that the buying shipper is willing to pay to the other to purchase the product. Selling shippers then select the buying shipper whose price best meets the selling shipper's expectations.

A buying shipper then has the option of opening two or more identical product/load and equipment bulletin boards so that both are on a computer screen at the same time. One board can be sorted and/or filtered for product/loads and the other can be sorted and/or filtered for compatible equipment. The buying shipper can then make equipment selections most appropriate to the specified requirements without having to go back and forth between separate screens.

To Post Services/Leases/Rentals/etc. on a Combination Master Bulletin Board:

Just as shippers can request bids and/or rates for hauling freight from carriers, companies (shippers) offering services, leases, rentals, etc. can advertise the availability of same and request bids or communicate this information to buyers. Offering shippers place their available services along with any requirements, similar to shippers placing loads with their requirements, on a combined master bulletin board (this board displays loads, products, services, equipment, tours, etc.).

Offering shippers enter information in a Request For Bid format (RFB) the same as shippers enter load information with the exception that in the origin city and destination city locations the carrier adds the prefix "SERV/", "LEASE/", "RENT/" before the city or before a descriptive area. (i.e.: If a shipper's service, lease, rental was available in a Milwaukee, Wis., the shipper would enter the following on the RFB: "SERV/MILWAUKEE", "LEASE/MILWAUKEE", "RENT/MILWAUKEE" in the origin city location with "WI" in the origin state location and the description of the service, lease, rental, etc. "TRAILERS one-way anywhere" in the destination city location with "NA" in the destination state location.). Shippers can be specific, general or a combination of the two in the destinations for their products. Quantities, size and unit prices can be included on the bulletin board.

Buying Shippers may then view the board to locate services, etc. that meets their needs available in type, location, dates, etc. The shipper then reviews an invite to bid (ITB) for the product(s) that shows all of the selling shipper's services, etc. and/or other details/requirements. The buying shipper then can either agree on a fixed rate as dictated by the selling shipper included in the invite information or the buying shipper may place a bid amount that the buying shipper is willing to pay to the other to use the service, etc. Selling shippers then select the one or all of the buying shippers.

A buying shipper then has the option of opening two or more identical service, etc. and load bulletin boards so that both are on a computer screen at the same time. One board can be sorted and/or filtered for services and the other can be sorted and/or filtered for compatible loads. The buying shipper can then make service, etc. selections most appropriate to the specified requirements without having to go back and forth between separate screens.

For example selecting two representative options, when a line in the bulletin board is selected and activated, the shipper could view the ITB 18 or the bid and/or rate report 21, known as the "best 7" report. The report 21 is represented in FIG. 1, and shown in more detail in FIG. 5. As seen in FIG. 5, for an Internet web browser version of the report, there is the proprietor logo and reference number and a shipper load ID in a upper area 60. There is a recap of the origin and destination in a next area 61. The bids and/or rates are shown in the next area 62 in a column format with the carriers indicated only by sort order from the lowest bid and/or rate to the highest in the report. Besides the bid and/or rate price, other data for the carrier profile is included for evaluation by the shipper. The shipper indicates selection of one of the bids and/or rates by selecting the number of the carrier which contains a hyperlink.

Figure 8:
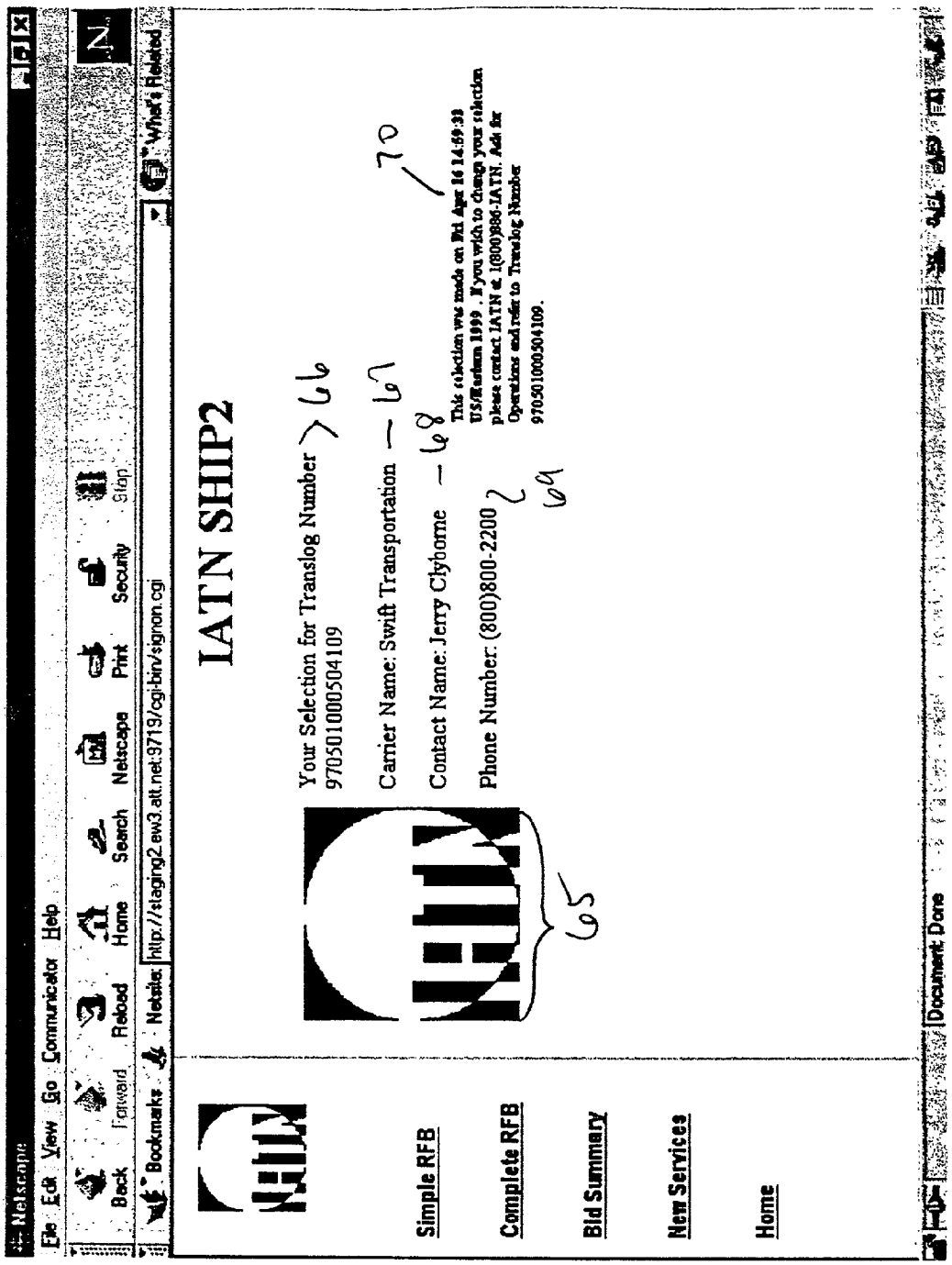
FIG. 8 is a notification of acceptance report of a type that would be displayed on the screen of a computer connected for communication with the central processing system of FIG. 2.
Figure 10E:

As a result of selecting one of the bids and/or rates, the shipper receives a bid and/or rate selection notice seen in FIG. 8. This notice includes the proprietor logo 65, the proprietor reference number 66, the name of the selected carrier 67, the name of a contact person 68 and a phone number of the carrier 69. The time of selection is also noted in area 70. The shipper can then call the carrier to confirm the pickup of the load.

In a further variation of the system, the identity of the shippers and carriers is provided on the ITB's 18 and Best 7 reports. In this variation, the calculate and find logic 15 in the central processing system 10 limits selection of qualified carriers to a predefined set of carriers who associate with one another through a chipping organization.

This has been a description of the preferred embodiment of the method and system of the present invention. Those of ordinary skill in this art will recognize that modification might be made while still coming within the spirit and scope of the invention and, therefore, to define the embodiments of the invention, the following claims are made.

I claim:

1. A computerized freight management method for arranging for shipment of a load from a shipper by a carrier, based on shipping data and carrier data supplied by the shipper and the carrier and for arranging for the buying or selling of a product, wherein the product comprises either a good or service, based on buyer data and seller data supplied by the buyer and the seller, the method comprising:

inputting into the central processing system a request for bids—from and—by the shipper for shipping the load and by a buyer for purchasing a product;

transmitting an invitation electronically to bid for shipping the load and for purchasing a product by the central processing system to a plurality of carriers and product sellers, wherein carriers and product sellers can review the individual invitations just on their individual bulletin boards or use all or part of the bulletin board, master bulletin board and grand master bulletin board included in the transportation and marketplace tool concept to address, compare individual and alternatives, coordinate, and analyze a myriad of critical interrelated aspects of the freight management and product environments to determine the best business decisions prior to submitting a bid, wherein the individual bulletin boards being combined into master bulletin boards and into the grand master bulletin board addresses all transportation and product subsets including individual and multiple loads, combined loads, multiple deliveries, tours, interlining, warehousing and products, wherein these bulletin boards can be public or private;

receiving bids electronically at the central processing system by at least some of the carriers for shipping the load and by the sellers for selling a product;

transmitting to the shipper electronically a bid report with bids received from at least some of the carriers and some of the product sellers receiving the invitation to bid generated by the central processing system; without the shipper and product buyer initiating communication with the computer system, wherein shippers and product buyers can review the individual bid reports just on their individual bulletin boards or use all or part of the bulletin board, master bulletin board and grand master bulletin board included in the transportation and marketplace tool concept to address, compare individual and alternatives, coordinate, and analyze a myriad of critical interrelated aspects of the freight management and product environments to determine the best business decisions prior to selecting a bid, wherein the individual bulletin boards being combined into master bulletin boards and into the grand master bulletin board addresses all transportation, product and service subsets including individual and multiple loads, combined loads, multiple deliveries, tours, interlining, warehousing and products, wherein these bulletin boards can be public or private;

receiving electronically at the central processing system by the shipper and by the buyer a bid selection of at least one of the bids; and storing all entries both public and private to the grand master bulletin board, along with the appropriate master bulletin boards and the appropriate bulletin boards electronically by the computer system.

2. The method of claim 1, further comprising the step of responding to the bid selection by the shipper and product buyer by the central processing system electronically transmitting a name and a phone number of the corresponding one of the carriers and product sellers to the shipper and product buyer.

3. The method of claim 1, wherein the invitation to bid is first transmitted from the central processing system to a third party, who then communicates the invitation to bid to a plurality of carriers and product sellers in locations remote from the central processing system, and wherein the bids for at least some of the carriers and product sellers are electronically received at the central processing system as inputted by the third party.

4. The method of claim 1, wherein the step of transmitting an invitation to bid electronically further includes transmitting invitations for bids electronically for a plurality of loads by the central processing system to an individual carrier and product seller.

5. The method of claim 1, wherein the step of transmitting to the shipper and product buyer electronically a plurality of bids further includes transmitting to the shipper and product buyer electronically bids for a plurality of loads from a plurality of carriers and product sellers—by the central processing system.

6. A computerized method of buying or selling a product wherein the product comprises either a good or a service, the method comprising:

making a plurality of invitations to bid from a plurality of product buyers and shippers available to a plurality of product sellers and carriers on the computer system for electronic access by the product sellers and carriers, wherein carriers and product sellers can review the individual invitations just on their individual bulletin boards or use all or part of the bulletin board, master bulletin board and grand master bulletin board included in the transportation and marketplace tool concept to address, compare individual and alternatives, coordinate, and analyze a myriad of critical interrelated aspects of the freight management and product environments to determine the best business decisions prior to submitting a bid, wherein the individual bulletin boards being combined into master bulletin boards and into the grand master bulletin board addresses all transportation and product subsets including individual and multiple loads, combined loads, multiple deliveries, tours, interlining, warehousing and products, wherein these bulletin boards can be public or private;

making a plurality of bids from a plurality of product sellers and carriers available to product buyers and shippers on said computer system for electronic access by the product buyers and shippers;

receiving in response electronically a plurality of bids from a plurality of product sellers and carriers for a product requested by a product buyer and shipper, making an analysis of the bids and generating a first report that ranks the bids according to at least one predetermined criterion stored in the computer system;

transmitting the first report to the product buyer and shipper electronically without the product buyer and shipper initiating communication with the computer system, wherein shippers or product buyers can review the individual bid reports just on their individual bulletin boards or use all or part of the bulletin board, master bulletin board and grand master bulletin board included in the transportation and marketplace tool concept to address, compare individual and alternatives, coordinate, and analyze a myriad of critical interrelated aspects of the freight management and product environments to determine the best business decisions prior to selecting a bid, wherein the individual bulletin boards being combined into master bulletin boards and into the grand master bulletin board addresses all transportation and product subsets including individual and multiple loads, combined loads, multiple deliveries, tours, interlining, warehousing and products, wherein these bulletin boards can be public or private;

wherein the product buyer and shipper can select one of the bids and communicate an acceptance to the computer system, which will then notify the other party of the communication to complete the sale; and storing all entries both public and private to the grand master bulletin board, along with the appropriate master bulletin boards and the appropriate bulletin boards electronically by the computer system.

7. The method of claim 6, wherein in response to receiving a plurality of invitations to bid from a plurality of buyers and shippers, making an analysis of the offers to invitations to bid and distributing the invitations to bid to product sellers and carriers according to at least one predetermined criterion stored in the computer system; and transmitting the second report electronically to the product seller and carrier without the product seller and carrier initiating communication with the computer system.

8. The method of claim 6, wherein forms containing the invitations to bid can be stored in the computer system, and revised with indicators by adding a letter suffix to the system number to save re-inputting the forms into the computer system.

9. The method of claim 6, wherein invitations to bid can be imported in large numbers from existing computer databases through the use of electronic transfer programs.

10. The method of claim 6, wherein a duplicate of an invitation to bid on the computer system is transmitted from the computer system to a third party intermediary, wherein the third party intermediary is unable to change any data or information of the original invitation to bid except for the list of potential product sellers and carriers for receiving the resulting request to buy from the third party intermediary, and indicating on the computer system an original of the invitation to bid and on the duplicate that they are being communicated to potential product sellers and carriers at the same time.

11. The method of claim 6, wherein the plurality of invitations to bid from a plurality of products buyers and shippers available to a plurality of product sellers and carriers on the computer system for electronic access by the product buyers and shippers includes making products and loads available to product sellers and carriers on an electronic bulletin board accessed through the computer system, wherein making a plurality of bids by a plurality of product sellers and carriers available to product buyers and shippers on said computer system for electronic access by the product buyers and shippers includes making prospective scheduled product sellers and carriers available to product buyers and shippers on an electronic bulletin board accessed through the computer system.

12. The method of claim 6, wherein the invitations to bid are provided by transportation shippers and product buyers, and wherein the bids are provided by transportation carriers and product sellers, and wherein the computer system electronically selects invitations to bid or bids in groups of seven and orders the bids or invitations to bid based on price and other factors.

13. The method of claim 6, wherein the reports to the product buyer and shipper are accessible on the computer system through a carrier bulletin board and product seller bulletin board and the reports to the carrier and product seller are accessible on the computer system through a shipper and product buyer bulletin board.

14. The method of claim 6, further comprising maintaining a grand master bulletin board of all data on the computer system which further comprises publicly accessible shipper and product buyer master bulletin boards and bulletin boards and publicly accessible carrier and product seller master bulletin boards and bulletin boards and private access networks that have limited access.

15. The method of claim 6, further comprising a grand master bulletin board, master bulletin boards and bulletin boards with line items including items for sale and line item link buttons on said grand master bulletin board, master bulletin boards and bulletin boards for directly accessing other data provided by the product buyers and shippers and product sellers and carriers.

16. The method of claim 6, wherein available transportation equipment and planned trips, as well as loads, warehousing and products can be entered into the system all similar to a load with qualifications and descriptions as line items in lists of items and/or with descriptive prefixes.

17. The method of claim 6, wherein invitations to bid and bids transmitted to the product buyers and shippers and product sellers and carriers do not indicate the identity of the product buyers and shippers and the product sellers and carriers, wherein the anonymity of each and requiring selections can be based on individual qualifications and price.

18. The method of claim 6, further characterized in invitations to bid and bids transmitted to the product buyers and shippers and product sellers and carriers do not indicate the identity of the product buyers shippers; and the product sellers and carriers do indicate the identity of the product buyers and shippers and the product sellers and carriers, when the participants are already associated with or contracted to each other, thereby eliminating the need for anonymity.

19. The method of claim 6, wherein a third party can initially submit a bid to a product buyer and shipper of $0.00 or use a decline button indicating that for whatever reason the request to buy has been reviewed but has been declined, or the third party can initially bid $1.00 or use an accept button to indicate that the reviewed request to buy will be handled and that the final bid and/or rate will be forthcoming, so that the product buyer and shipper will not have to submit the request to buy to another carrier and product seller.

20. The method of claim 6, wherein bids by product sellers and carriers for re-locating empty containers can be positive dollar amounts, zero or negative dollar amounts which would indicate that the product seller and carrier would pay the product buyer and shipper to move the empty container.

21. The method of claim 6, wherein the invitations to bid, bids and reports are transmitted by facsimile as facsimile data files and are converted on a receiving end using an optical character recognition program.

22. The method of claim 6, wherein invitations to bid, bids and reports are transmitted over the Internet.

23. The method of claim 6, wherein invitations to bid, bids and reports are transmitted in a data file via e-mail.

24. The method of claim 6, wherein the invitations to bid, bids and reports are created through interactive voice response.

25. The method of claim 6, further comprising the step of inputting carrier and product seller profile data into computer system, wherein the carrier and product seller data includes carrier and product seller identification data, carrier and product seller contact data, carrier service area data, carrier intermodal capabilities data, carrier load type services data, carrier type data, carrier and product seller annual revenue data, carrier and product seller employee size data, carrier on-time and damage-free delivery ratings data, carrier equipment data, carrier special services data, carrier commodities hauled data, carrier and product seller financial condition data, carrier hazardous license data, carrier driver data, carrier and product seller insurance data, and carrier rules and charges data.

26. The method of claim 6, wherein the invitation to bid can be compared with product seller and carrier profile data previously input to the computer system to select a group of qualified product sellers and carriers to receive the invitation to bid.

27. The method of claim 6, further comprising inputting product buyer and shipper profile data into the computer system, wherein the product buyer and shipper data includes product buyer and shipper identification data, product buyer and shipper contact data, product buyer and shipper annual revenue data, product buyer and shipper number of employees, and product buyer and shipper financial data.

28. The method of claim 6, wherein the invitation to bid includes product buyer and shipper qualifications to make a bid.

29. The method of claim 6, further comprising individual product buyer and shipper and product seller and carrier bulletin boards which can be customized by the product buyers and shippers and product sellers and carriers to the requirements of the product buyers and shippers and product sellers and carriers.

30. The method of claim 6, further comprising displaying multiple windows providing the display of a plurality of bulletin boards including at least two of the following: a bulletin board for transportation loads, a bulletin board for available transportation equipment, a bulletin board for trips, a bulletin board for products, and a bulletin board for warehousing services.

31. The method of claim 6, further comprising private access networks with access to the computer system, each private access network requiring input of individual member numbers and authorization codes for access to the computer system.

32. The method of claim 6, wherein the central processing system includes at least one central processing unit, a memory for storing a database of shipper and product buyer profile data and carrier and product seller profile data along with all of the individual load, equipment, product and the resulting transactional process and system, network, site integration data, and a communication interface to the Internet.

33. The method of claim 6, wherein the central processing system and/or database is located on and/or remote from the Internet.

34. A computerized freight management system for arranging for shipment of a load from a shipper by a carrier, based on shipping data and carrier data supplied by the shipper and the carrier and for arranging for the buying or selling of a product, wherein the product comprises either a good or service, based on product buyer data and product seller data supplied by the product buyer and the product seller the system comprising:
   a central processing system;
   means for making a plurality of invitations to bid from a plurality of shippers available to a plurality of carriers as a carrier's master bulletin board and/or bulletin board on the computer system for electronic access from the central processing system by the carriers and from a plurality or product buyers available to a plurality of product sellers as a product seller's master bulletin board and/or bulletin board on the computer system for electronic access from the central processing system by the product sellers;
   means for making a plurality of bids from a plurality of carriers available to shippers on said computer system as a shipper's master bulletin board and/or bulletin board for electronic access from the central processing system by the shippers or from a plurality of product sellers available to product buyers on said computer system as a product buyer's master bulletin board and/or bulletin board for electronic access from the central processing system by the product buyers;
   said shipper's master bulletin board and/or bulletin board and said carrier's master bulletin board and/or bulletin board are integrated together into a grand master bulletin board on the central processing system or said product buyer's master bulletin board and/or bulletin board and said product seller's master bulletin board and/or bulletin board are integrated together into a grand master bulletin board on the central processing system that is publicly accessible of which can be viewed by a member of the public, and
   wherein said grand master bulletin board also includes private master bulletin boards and bulletin boards that are only accessible by a limited number of parties having proper identification and passwords for access.

35. The freight management system of claim 34, wherein the central processing system includes at least one central processing unit and a communication interface to the Internet.

36. The freight management system of claim 34, wherein the central processing system includes at least one central processing unit, a memory for storing a database of shipper and product buyer profile data and carrier and product seller profile data, and a communication interface to the Internet.

37. The freight management system of claim 34, wherein the central processing system includes at least one central processing unit, a memory for storing a database of shipper and product buyer profile data and carrier and product seller profile data along with all of the individual load, equipment, product and the resulting transactional process and system, network, site integration data, and a communication interface to the Internet.

\* \* \* \* \*